United States Patent [19]
Takagi

[11] Patent Number: 5,442,417
[45] Date of Patent: Aug. 15, 1995

[54] AUTOMATIC FLASH AMOUNT CONTROL APPARATUS OF CAMERA

[75] Inventor: Tadao Takagi, Yokohama, Japan

[73] Assignee: Nikon Corporation, Tokyo, Japan

[21] Appl. No.: 81,221

[22] Filed: Jun. 25, 1993

[30] Foreign Application Priority Data

Jul. 22, 1992 [JP] Japan .................. 4-195496
Jul. 22, 1992 [JP] Japan .................. 4-195498

[51] Int. Cl.6 .................. G03B 13/36; G03B 15/05
[52] U.S. Cl. .................. 354/402; 354/415; 354/416
[58] Field of Search .......... 354/402, 415, 432, 195.12, 354/416, 417

[56] References Cited

U.S. PATENT DOCUMENTS

| | | | |
|---|---|---|---|
| 4,760,418 | 7/1988 | Ishizaki et al. | 354/432 X |
| 5,111,231 | 5/1992 | Tokunaga | 354/432 X |
| 5,164,759 | 11/1992 | Yasukawa | 354/432 X |
| 5,172,157 | 12/1992 | Takagi | 354/432 X |
| 5,221,941 | 6/1993 | Matsui et al. | 354/415 |
| 5,227,836 | 7/1993 | Yasukawa et al. | 354/415 |
| 5,268,730 | 12/1993 | Takagi | 354/432 X |

FOREIGN PATENT DOCUMENTS

| | | |
|---|---|---|
| 63-83713 | 4/1988 | Japan . |
| 1-285925 | 11/1989 | Japan . |
| 4-182631 | 6/1992 | Japan . |
| 4-355733 | 12/1992 | Japan . |

*Primary Examiner*—W. B. Perkey
*Attorney, Agent, or Firm*—Shapiro and Shapiro

[57] ABSTRACT

An automatic flash amount control apparatus of camera in which a flash device and a photographic lens are set, comprises a focus detection device for performing focus detection with a photographic field being divided into a plurality of focus detection zones, a metering device for metering in a plurality of divided metering regions beams emitted from the flash device and then reflected by the photographic field, a control region selecting device for selecting a metering region preponderantly to contribute to a flash amount control, and a control device for adjusting a flash amount of the flash device, based on a metering value in the metering region selected by the control region selecting device, wherein the control region selecting device selects a region determined in accordance with an output of the focus detecting device if the photographic lens has a long focal length, but a region preliminarily determined if the photographic lens has a short focal length.

13 Claims, 21 Drawing Sheets

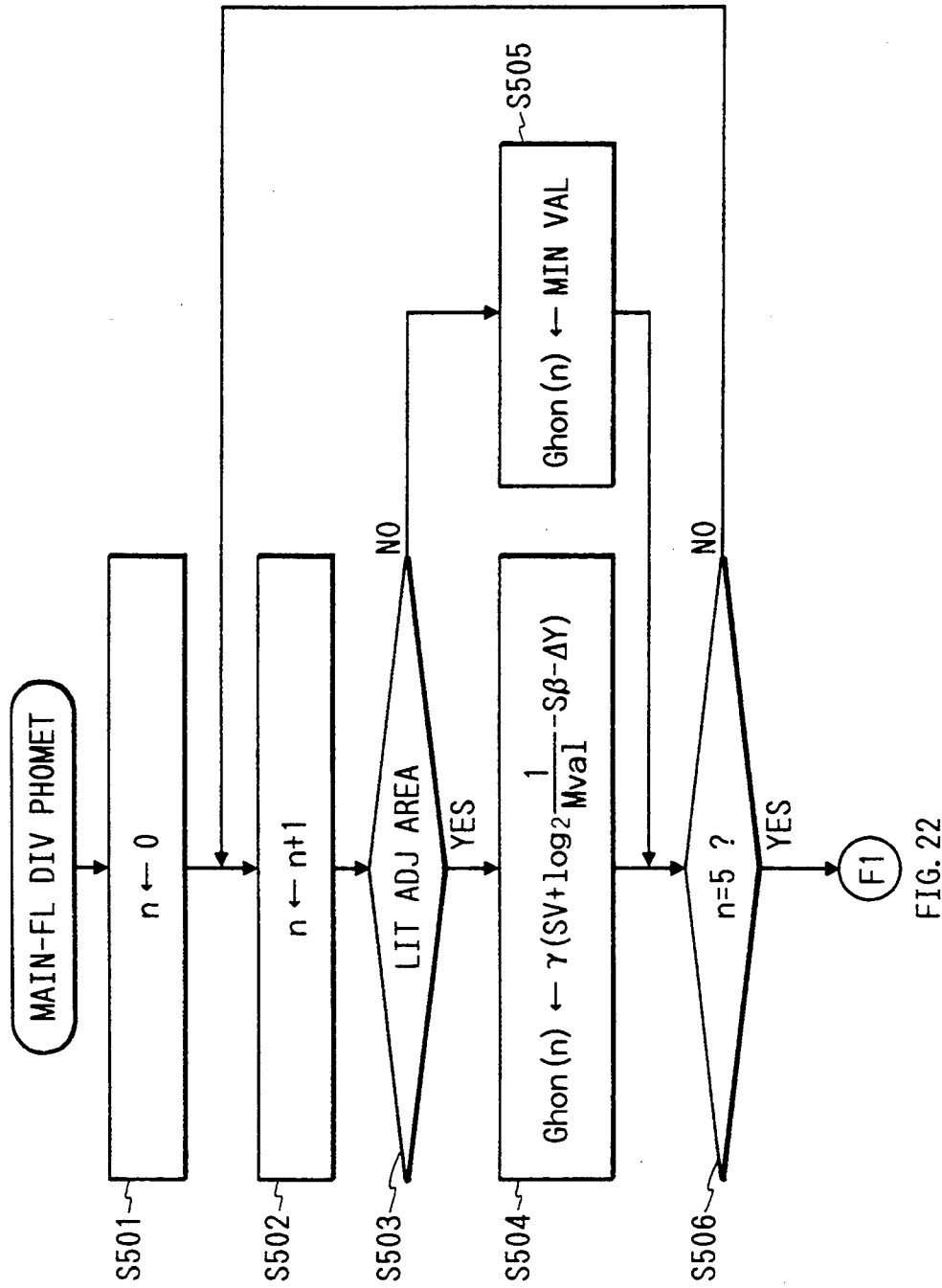

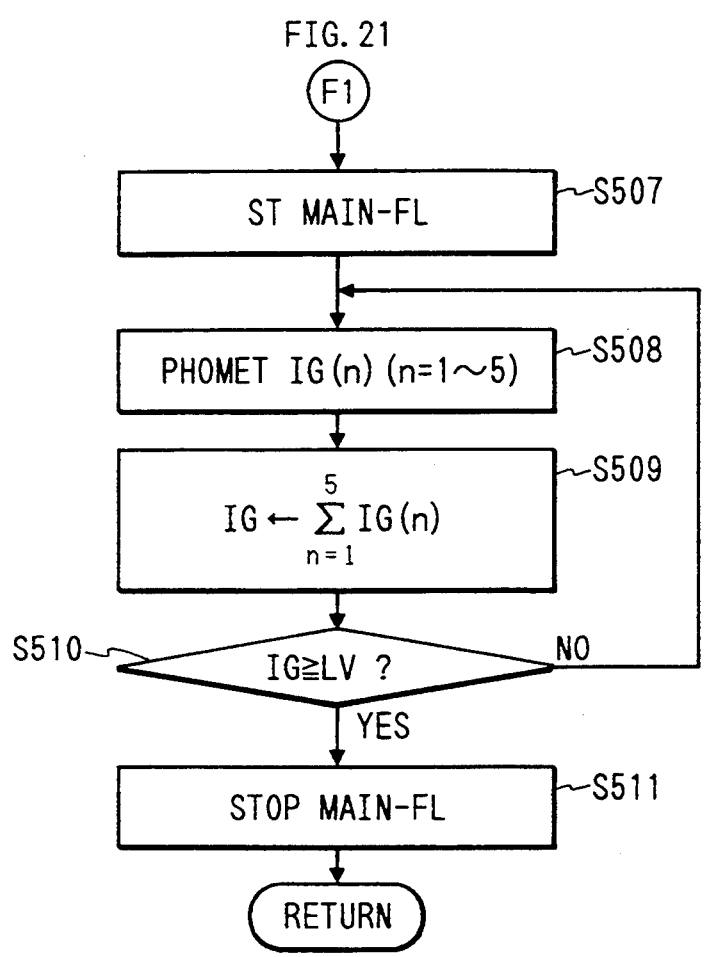

AUTOMATIC FLASH AMOUNT CONTROL APPARATUS OF CAMERA

BACKGROUND OF THE INVENTION

1. Field of the Invention

The present invention relates to an automatic flash amount control apparatus of camera, which meters a flash amount upon flashing with a photographic field being divided into a plurality of regions and which controls a flash amount in accordance with the result of metering.

2. Related Background Art

An automatic flash amount control apparatus of this type is for example as described in Japanese Patent Application No. 3-160140 filed by Applicant. This apparatus has electronic flash means capable of performing preliminary flash and main flash, in which segmental metering regions are used for metering of reflection light from a photographic field upon preliminary flash and in which control regions to contribute to a flash amount control upon main flash are determined based on focus detection information and the focusing mode. The flash amount control is carried out upon main flash, based on signals of metering in the thus determined control regions.

The automatic flash amount control apparatus, however, determines a metering region overlapping with a focus detection zone as a control target region when a focus detection device detects an in-focus state. If the focus detection device erroneously detects the in-focus state in that arrangement, proper exposure cannot be set in flash amount control, which was a problem to be solved.

Especially, in case that a photographic lens has a short focal length, the depth becomes shallower to decrease the focus detection accuracy, which may cause such a problem. For example, when the composition is shifted after the focus is set and locked on a main subject, the focus detection device is naturally to output a judgement of out-of-focus with respect to the background, though the photographic distance is fit to the main subject. However, if the photographic lens has a short focal length, it is not rare that the focus detection apparatus outputs a judgement of in-focus with respect to the background even in change of composition.

Another automatic flash amount control apparatus is for example as described in Japanese Patent Application No. 2-312487 filed by Applicant. This apparatus has electronic flash means capable of performing preliminary flash and main flash, in which segmental metering regions are used for metering of reflection light from a photographic field upon preliminary flash, in which the plural metering regions are separated into effective regions and noneffective regions, based on metering values and a photographic distance, and in which the main flash is controlled using the effective regions.

The automatic flash amount control apparatus, however, detects the photographic distance as a long distance corresponding to the background, if a focus detection device erroneously effects focusing on the background behind a main subject. If the separation between effective regions and noneffective regions is carried out using the long photographic distance, proper exposure cannot be set, which was another problem.

For example, since the main subject is considerably closer to the camera as compared with the detected photographic distance in the above case, the camera judges that reflection light from the main subject is too much, whereby the region is set as a noneffective region. Then, the flash amount control is effected upon main flash with target regions where the main subject is absent, resulting in obtaining an excessively overexposed picture.

In addition to the focusing through the focus detection device, the photographic distance may be determined by manually moving to set a distance ring of photographic lens based on estimation with eye and detecting the position of lens by an encoder. The same problem could occur in that case.

SUMMARY OF THE INVENTION

It is an object of the present invention to provide an automatic flash amount control apparatus of camera which can perform a proper flash amount control even if a focus detection device makes an erroneous detection.

It is another object of the present invention to provide an automatic flash amount control of camera which can perform a proper flash amount control even if a photographic distance is erroneously detected.

BRIEF DESCRIPTION OF THE DRAWINGS

FIG. 11 is a flowchart of a sub-routine to show the details of photo-metering process upon a preliminary flash;

FIG. 21 is a flowchart of a sub-routine to show the details of a process for controlling a flash amount upon a main flash; and FIG. 22 is a flowchart to follow FIG. 21.

DESCRIPTION OF THE PREFERRED EMBODIMENTS

An embodiment of the present invention will be described in detail with reference to FIG. 1 to FIG. 22.

Figure 1:
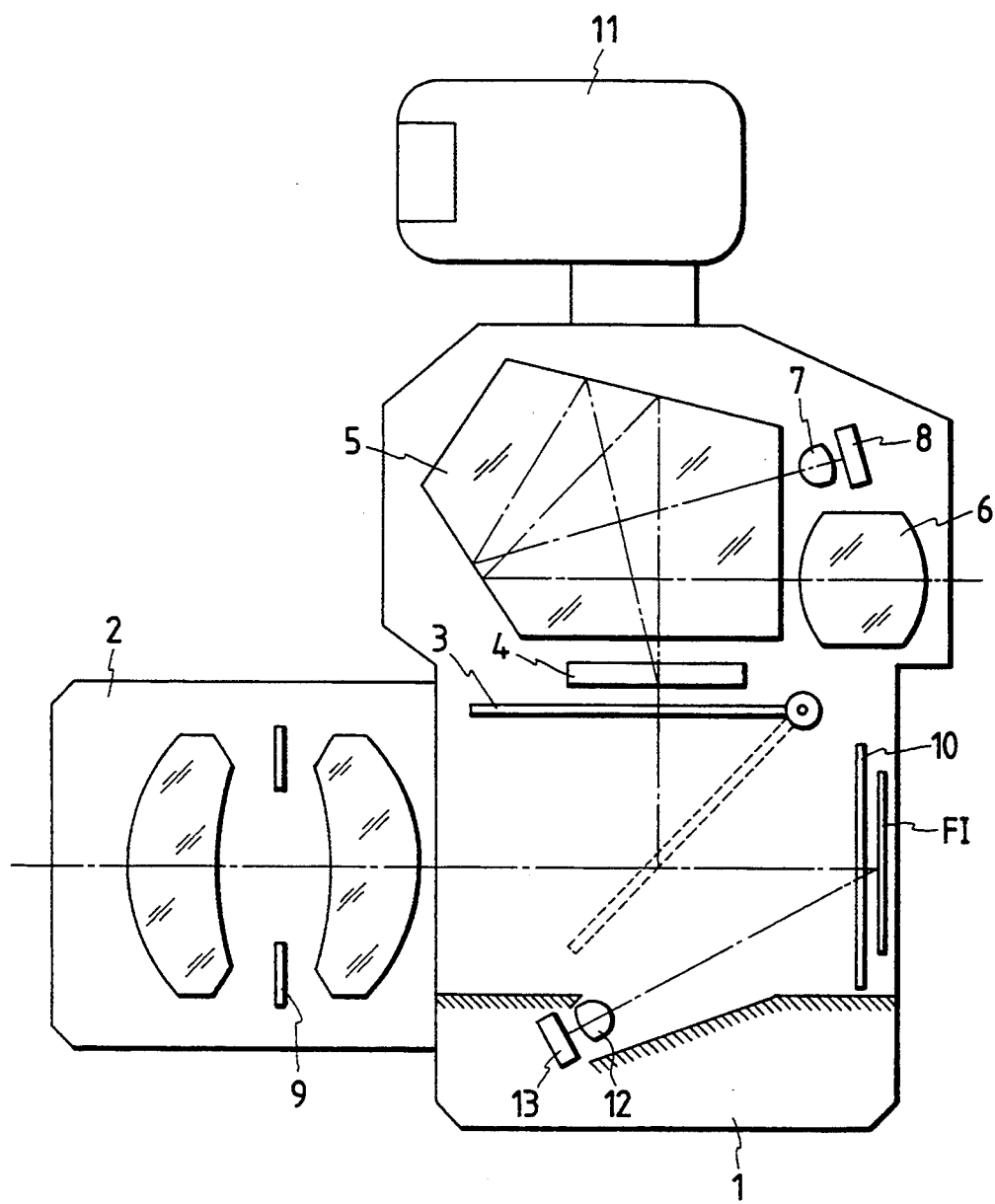
FIG. 1 is a drawing to show the structure of an automatic flash amount control camera according to the present invention.
Figure 4:
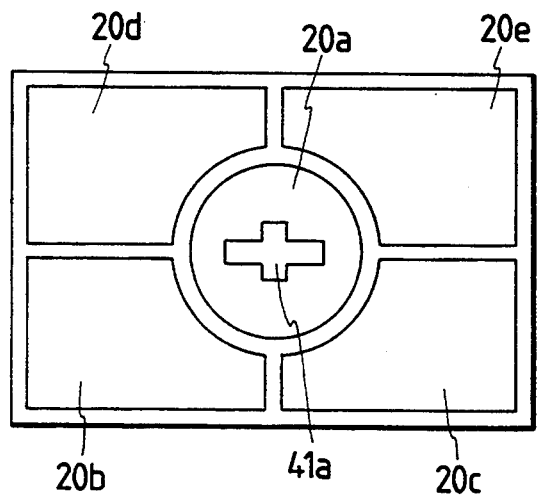
FIG. 4 is a drawing to show a relation between a focus detection zone and flash amount control regions.

FIG. 1 is a drawing to show the structure of a TTL automatic flash amount control camera. Upon viewing through a finder, an optical flux or stationary light passing through a photographic lens 2 is reflected by a mirror 3 in the down position as shown by a broken line, and then passes through a screen 4 and a pentaprism 5, a part of which is guided to an eye piece 6 and the other part of which passes through a condenser lens 7 to be guided to a photo-metering element 8 for exposure calculation. Upon photography, a release button 32 as shown in FIG. 4 is release-operated to drive the mirror 3 up to the up-position as shown by a solid line in FIG. 1, thereafter an aperture 9 is stopped down, and then a shutter 10 is opened and closed, whereby the light from a subject and then through the photographic lens 2 is guided to a film FI to effect exposure thereon.

Upon flash light photography, an electronic flash apparatus 11 performs a main flash after the opening of shutter 10 to illuminate the subject, and the light reflected by the subject passes through the photographic lens 2 to reach the plane of film. The optical flux reflected by the plane of film is guided through a condenser lens array 12 to a photosensitive element 13 for flash amount control to be received thereby. Further, the camera of the present embodiment is capable of executing a preliminary flash to check conditions of a field to be photographed prior to the main flash. The light reflected by the photographic field upon the preliminary flash is reflected by a shutter curtain before the opening of shutter 10, and is then received by the photosensitive element 13.

Figure 2:
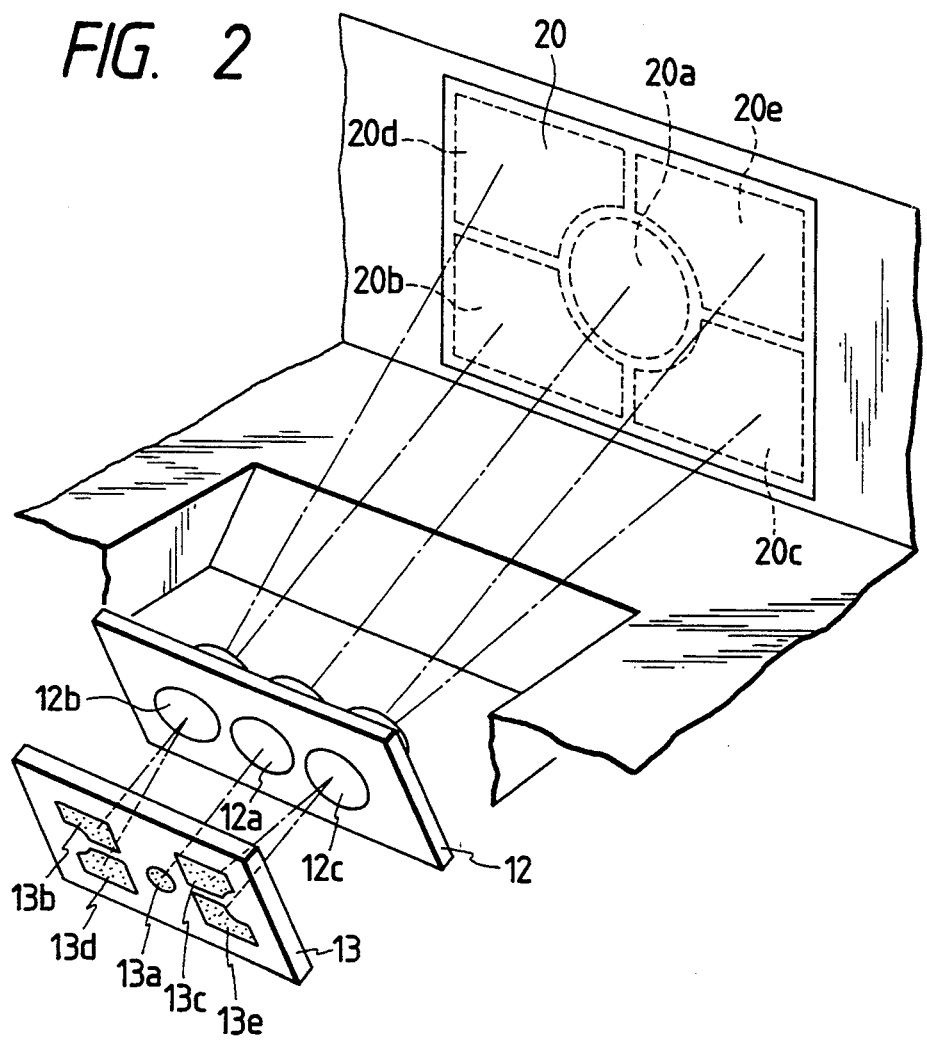
FIG. 2 is a perspective view to show a positional relation among a condenser lens array, a divided metering element, and a film.

The photosensitive element 13 is comprised mainly of a photosensitive element segment 13a and photosensitive element segments 13b–13e arranged on a common plane, as shown in FIG. 2. The photosensitive element segment 13a corresponds to a disk metering region at the center of photographic field. The photosensitive element segments 13b–13e correspond to metering regions respectively having a shape of rectangle lacking a corner arc and arranged at a periphery of photographic field. Therefore, the photosensitive element 13 performs segmental photometry of five photometric regions so divided in the photographic field in the present embodiment. The condenser lens array 12 is an optical member having three lens portions 12a–12c corresponding to left, middle, and right blocks of photosensitive element segments 13a–13e.

When an exposure region 20 of one frame on the film plane is divided into five regions comprised of a central disk 20a and quarterly-divided peripheries 20b–20e in the same manner as the photographic field, as shown in FIG. 2, the left, middle, and right blocks of photosensitive element segments 13a–13e are respectively opposed to the left, central, and right parts of film exposure region 20 via the three lens portions 12a–12c of condenser lens array 12, as shown by broken lines. Since the segmented photosensitive element 13 is approximately conjugate with the film exposure region 20, respective brightness values of five regions 20a–20e may be metered with the segments divided in almost identical shape.

Figure 3:
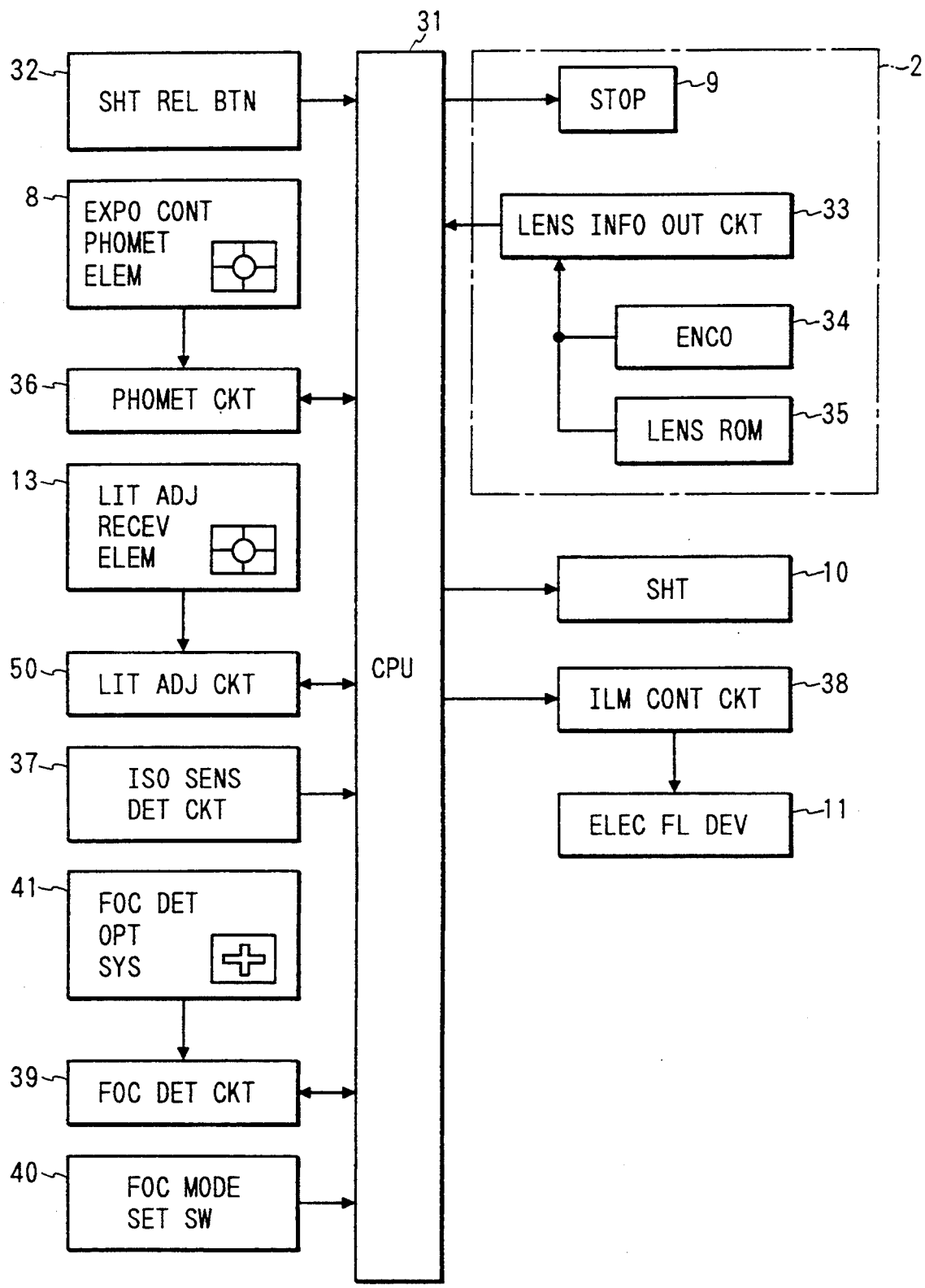
FIG. 3 is a block diagram to show the structure of an automatic flash amount control apparatus of the camera.

FIG. 3 is a block diagram of a control system. Connected to a CPU 31 which controls the sequence of entire camera are the shutter release button 32, the shutter 10, the aperture 9 in the photographic lens 2, and a lens information output circuit 33. The lens information output circuit 33 provides the CPU 31 with information, e.g. a photographic distance X detected by a conventional distance encoder 34 in lens; and an F-value at full open aperture FO, an exit pupil distance PO, and a photographic distance error $\Delta X$ due to the resolution of the encoder 34 and other factors, stored in a lens ROM 35.

Also connected to the CPU 31 are a metering circuit 36 for conducting the photo-metering based on an output from the exposure control metering element 8, a flash amount control circuit 50 for conducting the flash amount control based on outputs from the photosensitive element 13 or photosensitive element segments 13a–13e, an ISO speed detecting circuit 37 for reading out an ISO speed of mounted film FI from the DX code, and a flash control circuit 38 for the electronic flash apparatus 11. The metering element 8 for exposure control is also comprised of five metering element segments 8a–8e corresponding to respective metering regions of photographic field in the same manner as the photosensitive element 13. A conventional focus detecting optical system 41 measures a distance near the central region of screen, and its output is converted into an amount of focus deviation $\Delta Y$ by a focus detecting circuit 39 and thereafter is input into the CPU 31.

A focusing mode setting switch 40 is an operational member for selecting one mode from the following three modes: S-AF mode (single AF mode), in which once the photographic lens becomes in focus on a subject after start of focusing, the lens position is locked there; C-AF mode (continuous AF mode), in which focusing is continuously conducted as long as the release button is half-pressed; and M mode (manual focusing mode).

FIG. 4 is a drawing to show the metering pattern of the photosensitive element 13 for flash amount control as described with FIG. 3 and the detection zone pattern of the focus detecting optical system 41, which are superimposed on each other on the photographic screen. The center circle 20a in the exposure region 20 is superimposed on a detection zone 41a of the focus detecting optical system.

Figure 5:
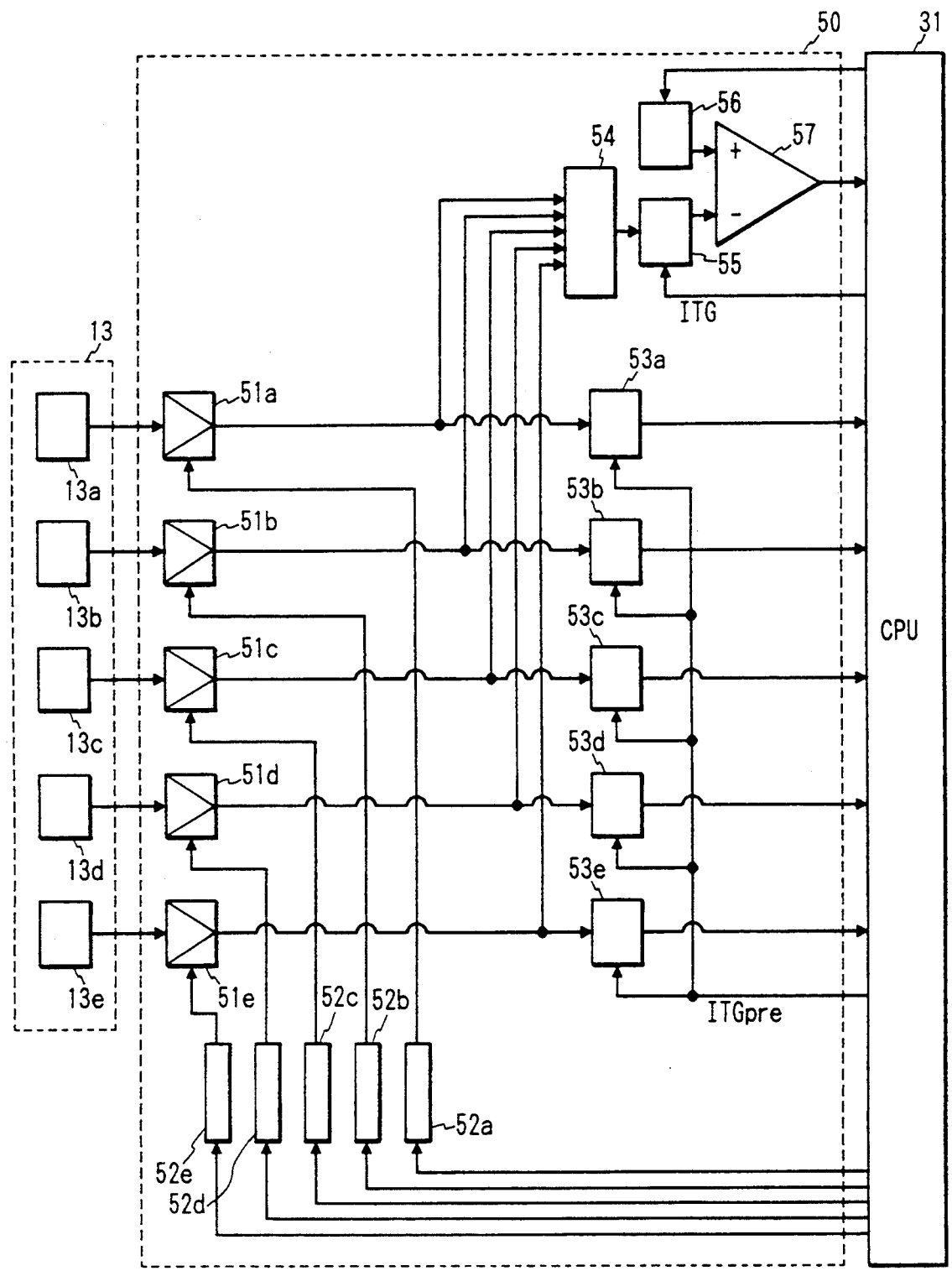
FIG. 5 is a drawing to show the details of a flash amount control circuit.

FIG. 5 shows the details of the above flash amount control circuit 50. The flash amount control circuit 50 has amplifiers 51a–51e for amplifying the output of the photosensitive element segment 13a–13e and gain setting devices 52a–52e for setting an amplifying rate of amplifier 51a–51e in response to a command from the CPU 31. The gain setting device 52a–52e comprises a D-A converter for converting a digital signal from the CPU 31 into an analog signal.

The flash amount control circuit 50 further has integration circuits 53a–53e for respectively integrating the output of amplifier 51a–51e upon preliminary flash with respect to time, an adder 54 for summing up the outputs of the amplifiers 51a–51e upon main flash, an integration circuit 55 for integrating the addition result of the adder 54 with respect to time in response to a command from the CPU 31, a converting circuit 56 for converting a later-detailed flash control level preliminarily stored as analog signal in the CPU 31 into a digital signal, and a comparator 57 for comparing the output of the integration circuit 55 with the converted flash amount control level to output a flash stop signal when the output of the integration circuit 55 reaches the flash amount control level.

The flash photography control operation of CPU 31 will be explained with reference to the flowcharts in FIGS. 6–22.

Figure 6:
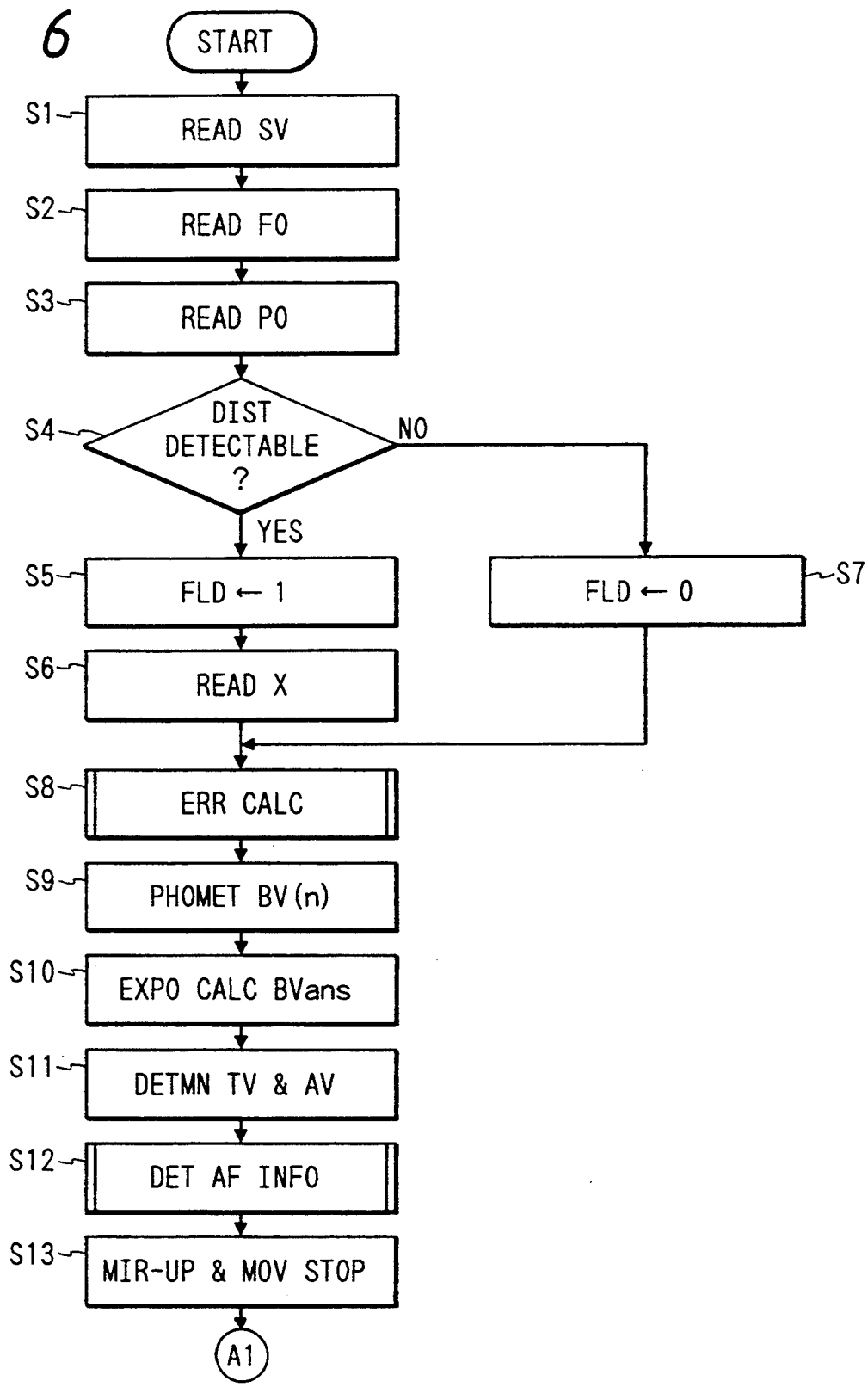
FIG. 6 is a flowchart of main program to illustrate the procedure of control in flash photography.
Figure 7:
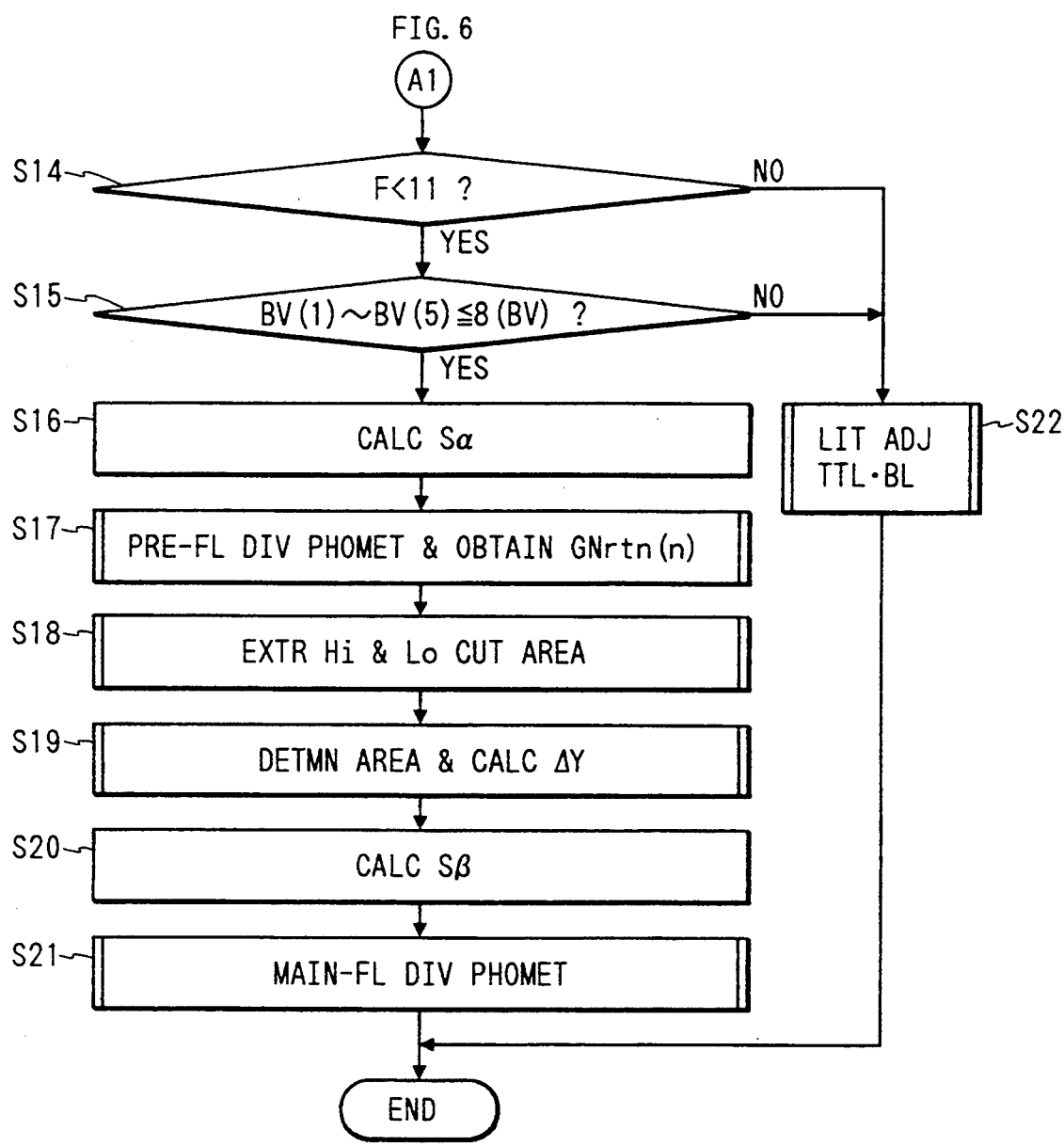
FIG. 7 is a flowchart to follow FIG. 6.

FIGS. 6 and 7 show a flowchart for main control program. Processes starting with Step 1 are executed when the shutter release button 32 (FIG. 4) is fully pressed or released after half-pressed. An ISO speed SV of mounted film FI is read out of the ISO detecting circuit 37 at Step S1. Also read out of the lens information output circuit 33 in the photographic lens 2 are an F value at full open aperture FO at Step S2 and an exit pupil distance PO at Step S3.

It is judged at Step S4 whether a photographic distance can be detected. For example, if the photographic lens 2 has an internal distance encoder 34 as shown in FIG. 4, the distance can be detected, and 1 is put into a flag FLD at Step S5. In contrast, if the photographic lens 2 includes no internal encoder 34, the distance cannot be detected, and 0 is put into the flag FLD at Step S7. After Step S5, the photographic distance X detected by the encoder 34 is read through the lens information output circuit 33 at Step S6, and then the flow goes to Step S8. After Step S7, the flow goes directly to Step S8.

At Step 8, calculation of errors is carried out for use in extracting candidates of Hi and Lo cut regions as described later. The errors are roughly classified into errors in detection of photographic distance and errors caused by the preliminary flash of flash apparatus. The detection errors are further classified into the following two kinds:

(1) Errors caused by the lens barrel upon detection of photographic distance; and (2) Errors caused by focusing in body upon detection of photographic distance. Details of this process will be later explained with reference to FIGS. 8 and 9.

Stationary light is metered at Step S9. In detail, the metering circuit 36 takes in the outputs of the five metering element segments 8a–8e (FIG. 3) as described above and then effects logarithmic compression thereon. The CPU reads logarithm-compressed brightness values BV(n) (n=1–5) corresponding to the respective metering regions. The values of n, i.e., 1–5, correspond to the five metering element segments 8a–8e or the photosensitive element segments 13a–13e. A stationary light exposure value BVans is calculated at Step S10 from the read brightness values BV(n) and ISO speed SV. The calculation may be carried out for example by using the method as disclosed in FIG. 7 of Japanese Laid-open Patent Application No. 1-285925 filed by Applicant.

A shutter speed TV and an aperture value AV are then determined at Step S11 by a known program chart from the thus-calculated stationary light exposure value BVans, and then the flow proceeds to next Step S12.

Information about focusing is detected at Step S12. Specifically, the detected information is about the focusing mode and about a state of focusing. The focusing mode is the continuous AF mode, the single AF mode, or the manual focusing mode for manual setting, as described above. The state of focusing means a value of focus deviation. Details thereof will be later explained with reference to FIG. 10. Then at Step S13, the mirror 3 is raised from the state shown by the broken line to the state shown by the solid line in FIG. 2, and the aperture 9 is stopped down to the aperture value AV determined at Step S11. Then the flow proceeds to Step S14 in FIG. 7.

Steps S14 and S15 are a judgement process for judging whether a preliminary flash is to be carried out. If it is judged at Step S14 that the aperture value AV determined at above Step S11 is dark over a predetermined value (for example, if the F value is not less than 11 in the present embodiment), the flow proceeds to Step S22 without preliminary flash, because it is highly probable that a preliminary flash of small flash amount cannot be detected. If it is judged at Step S15 that the stationary light is sufficiently bright (if all the brightness values BV(1)–BV(5) exceed 8 EV), the flow proceeds to Step S22 without preliminary flash, because a preliminary flash could be obscured by the stationary light. Otherwise, the flow proceeds to Step S16. At Step S22 the TTL-BL flash control is carried out without preliminary flash, and then the flow goes to the end. The TTL-BL flash control is described in Japanese Laid-open Patent Application No. 63-83713 filed by Applicant, and omitted to described here.

At Step S16, a correction coefficient $S\alpha(n)$ is calculated by the following equations for each metering region of selected photographic lens upon the metering of shutter curtain reflection.

$$S\alpha(1) = 1$$

$$S\alpha(2) = 1 - (1.2 \times 10^{-3}) \cdot PO$$

$$S\alpha(3) = 1 - (1.2 \times 10^{-3}) \cdot PO$$

$$S\alpha(4) = 1 + (1.7 \times 10^{-3}) \cdot PO$$

$$S\alpha(5) = 1 + (1.7 \times 10^{-3}) \cdot PO$$

In the equations, PO represents an exit pupil distance of the photographic lens 2. Since the condition of light reception of the above-mentioned photosensitive element segments 13a–13e changes depending on the exit pupil distance PO of photographic lens 2, the above lens correction coefficients $S\alpha(n)$ are obtained at the process of Step S16 to evaluate all metering signals of the photosensitive element segments in the same condition.

The preliminary flash is carried out at Step S17 to perform the segmental photometry of reflection light from the shutter curtain surface. At Step S18 a candidate of metering region to be cut, as will be referred to as a cut region candidate, is extracted based on the metering result. The cut region candidate is a metering region which is supposed to make no contribution upon main flash. At Step S19, metering regions supposed to make a contribution to the flash amount control upon main flash (which will be called as effective regions) are determined based on the result of process at Step S18, and the control correction amount $\Delta Y$ is determined as well. The processes at Steps S17–S19 will be later detailed with reference to FIGS. 11–20. A correction coefficient $S\beta(n)$ is calculated at Step S20 for each of the metering regions of selected photographic lens 2 upon the metering of reflection light from the film plane. It is provisionally supposed in this embodiment that $S\beta(n) = S\alpha(n)$. At Step S21 the shutter 10 is fully opened with main flash, and the flash amount control is performed by segmental photometry of reflection light from the film plane. This process will be later described in detail with reference to FIGS. 21 and 22.

Figure 8:
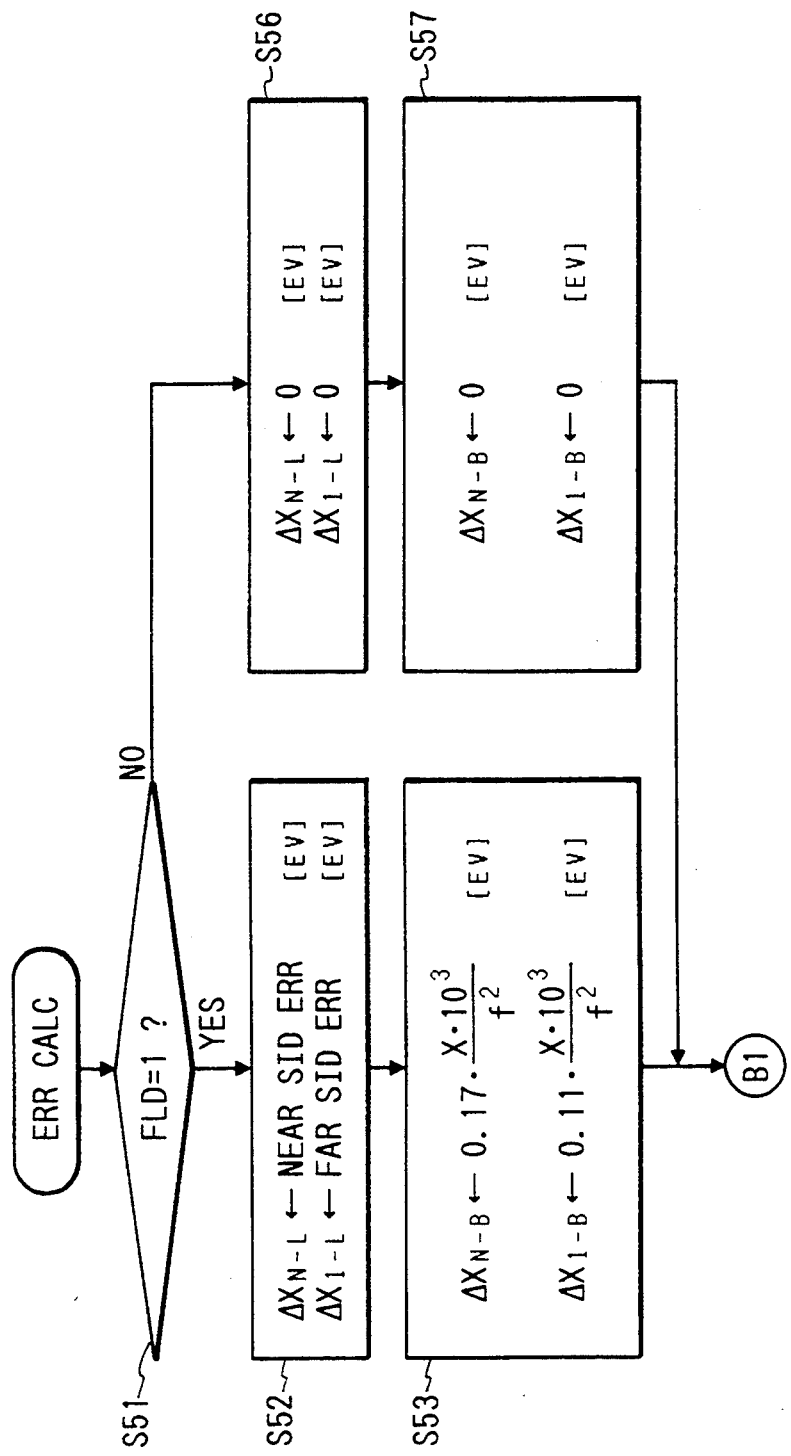
FIG. 8 is a flowchart of a sub-routine to show the details of error calculation.
Figure 9:
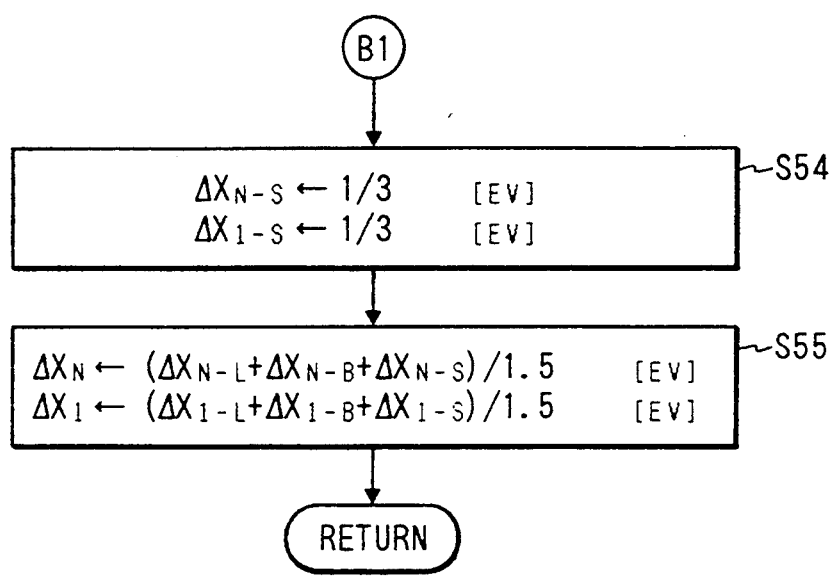
FIG. 9 is a flowchart to follow FIG. 8.

FIGS. 8 and 9 show a flowchart to illustrate the details of the process at Step S8, i.e., the error calculation in FIG. 6.

When it is judged at Step S51 that the flag FLD=1, that is, when the photographic distance is detectable with a distance encoder built in the photographic lens 2, the flow goes to Step S52. Read through the lens information output circuit 33 at Step S52 is a distance detection error ΔX related to the photographic lens, which is stored in the lens ROM 35 of the photographic lens 2. The distance detection error ΔX is comprised of a near side error $\Delta X_{N-L}$ and a far side error $\Delta X_{I-L}$ with respect to a nominal photographic distance X, which are supposed to be preliminarily stored in the lens ROM 35. Their unit is [EV]. Next at Step S53, the distance detection error related to the focusing in camera body is calculated. A calculation equation is approximated as follows, considering easiness of calculation:

$$\Delta X_{N-B} = 0.17 \cdot (X \cdot 10^3)/(f^2)$$

for the near side error $\Delta X_{N-B}$; and $$\Delta X_{I-B} = 0.11 \cdot (X \cdot 10^3)/(f^2)$$

for the far side error $\Delta X_{I-B}$. In the equations, a unit of focal length f is [mm], a unit of photographic distance X [mm], and a unit of the errors ΔX [EV]. The distance detection error related to the focusing in camera body is in proportion to the photographic distance but in inverse proportion to the square of focal length.

Next at Step S54 in FIG. 9, errors related to the preliminary flash of the flash apparatus 11 are set. Setting values are as follows:

$$\Delta X_{N-S} = \tfrac{1}{3}$$

for the near side error $\Delta X_{N-S}$; and $$\Delta X_{I-S} = \tfrac{1}{3}$$

for the far side error $\Delta X_{I-S}$. Thus the setting values are constant. A unit of the error ΔX is [EV].

At Step S55, the total of the above errors is calculated as follows:

$$\Delta X_N = (\Delta X_{N-L} + \Delta X_{N-B} + \Delta X_{N-S})/1.5$$

for a near side total error $\Delta X_N$; and $$\Delta X_I = (\Delta X_{I-L} + \Delta X_{I-B} + \Delta X_{I-S})/1.5$$

for a far side total error $\Delta X_I$. A unit of the total error ΔX is [EV].

Then the flow returns to the processes in FIG. 6. When it is judged at Step S51 that the flag FLD is not 1, that is, when the distance is not detectable without a distance encoder built in the photographic lens 2, the flow proceeds to Step S56.

At Step S56, a distance detection error ΔX related to the photographic lens is set as follows:

$$\Delta X_{N-L} = 0$$

for the near side error $\Delta X_{N-L}$; and $$\Delta X_{I-L} = 0$$

for the far side error $\Delta X_{I-L}$.

At Step S57, a distance detection error ΔX related to the focusing in camera body is set as follows:

$$\Delta X_{N-B} 0$$

for the near side error $\Delta X_{N-B}$; and $$\Delta X_{I-B} = 0$$

for the far side error $\Delta X_{I-B}$. The flow goes to Step S54 thereafter.

Figure 10:
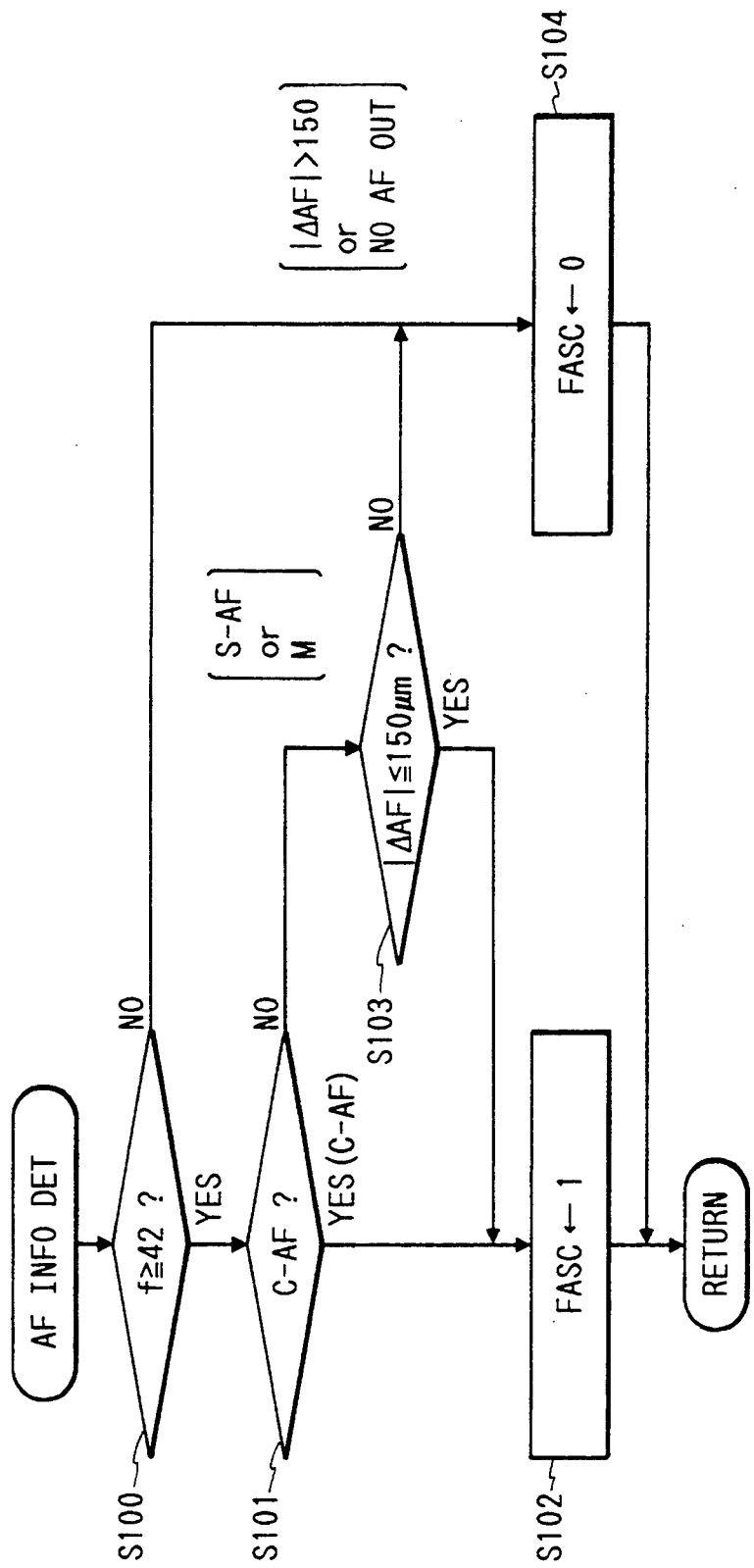
FIG. 10 is a flowchart of a sub-routine to show the details of AF information detecting process.

FIG. 10 is a flowchart to show in detail the AF information detection process at Step S12 in FIG. 6.

First at Step S100 a judgement process is carried out about the focal length of photographic lens 2. If the focal length f is 42 mm or more then the flow goes to Step S101; otherwise to Step S104. The advance to Step S104 means that it cannot necessarily be determined that a main subject is present in the focus detection zone. In case that a photographic lens has a short focal length, the branch through Step S104 is used irrespective of the output of the focus detection apparatus. If the composition is shifted after the lens is locked in focus on a main subject, the focus detection apparatus outputs a judgement of out-of-focus with respect to the background, though the photographic distance is suitable for the main subject. However, in case of the photographic lens 2 having a short focal length, it is not rare that a judgement of in-focus on the background is output upon change of the composition, because the depth becomes shallower. This process is provided as a countermeasure against it.

The judgement of focusing mode is carried out at Step S101. If the aforementioned C-AF mode is set as the focusing mode, it is judged that the main subject overlaps with the focus detection zone (central portion) of photographic screen, and 1 is put into a flag FASC at Step S102. If the S-AF mode or the M mode is set, Step S103 is processed, because it cannot be judged whether the main subject overlaps with the focus detection zone of screen. It is judged at Step S103 whether an absolute value |ΔY| of focus deviation ΔY immediately before photographing is not more than 150 μm. If the absolute value |ΔY| is not more than 150 μm, Step S102 is processed under an assumption that the main subject overlaps with the focus detection zone of screen, to put 1 into the flag FASC. On the other hand, if the absolute value |ΔY| is more than 150 μm, Step S104 is processed under an assumption that the main subject does not overlap with the focus detection zone of screen or that it is undistinguishable, to put 0 into the flag FASC. Then the flow returns to the processes in FIG. 6.

Figure 12:
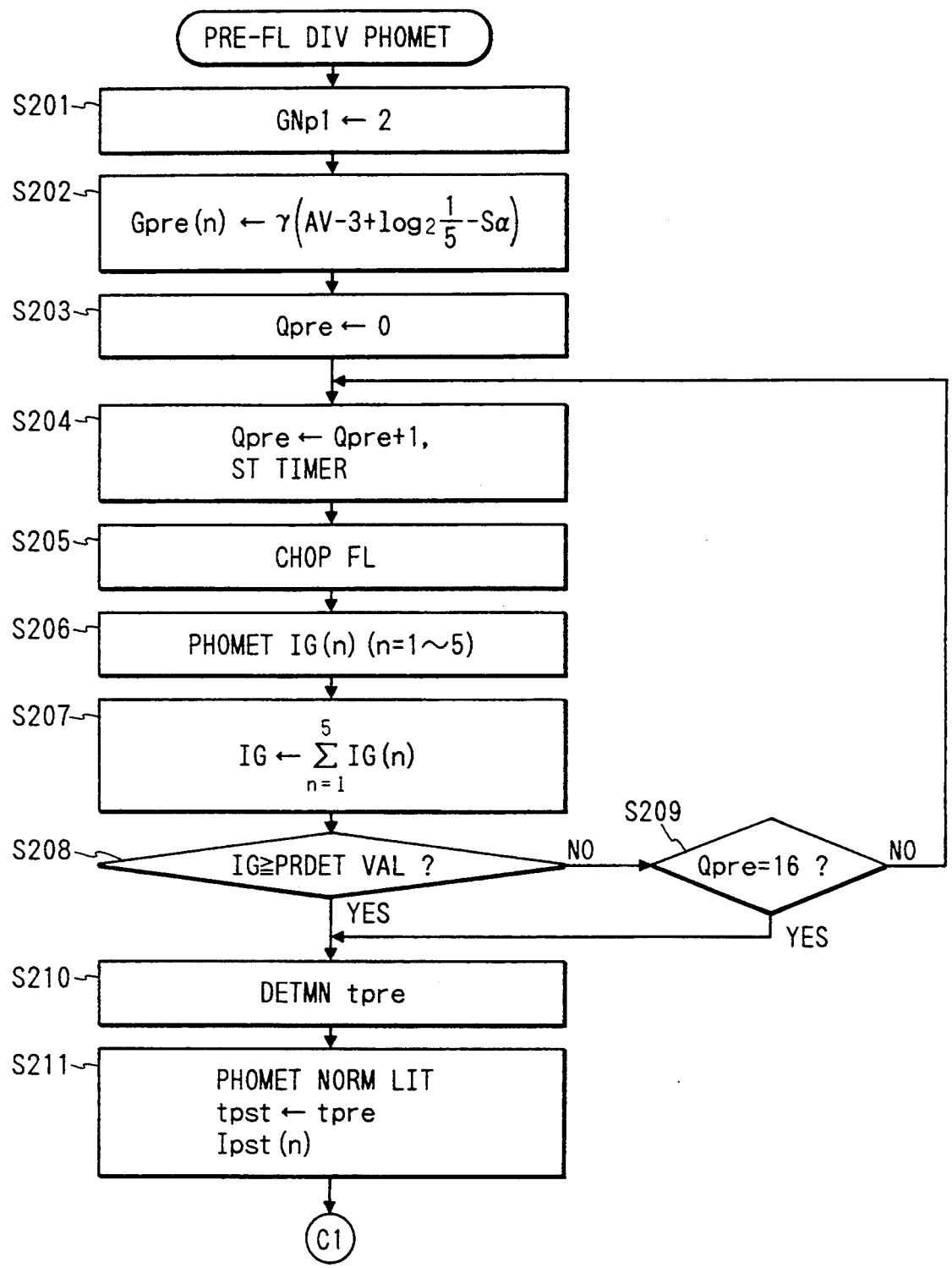
FIG. 12 is a flowchart to follow FIG. 11.
Figure 12:
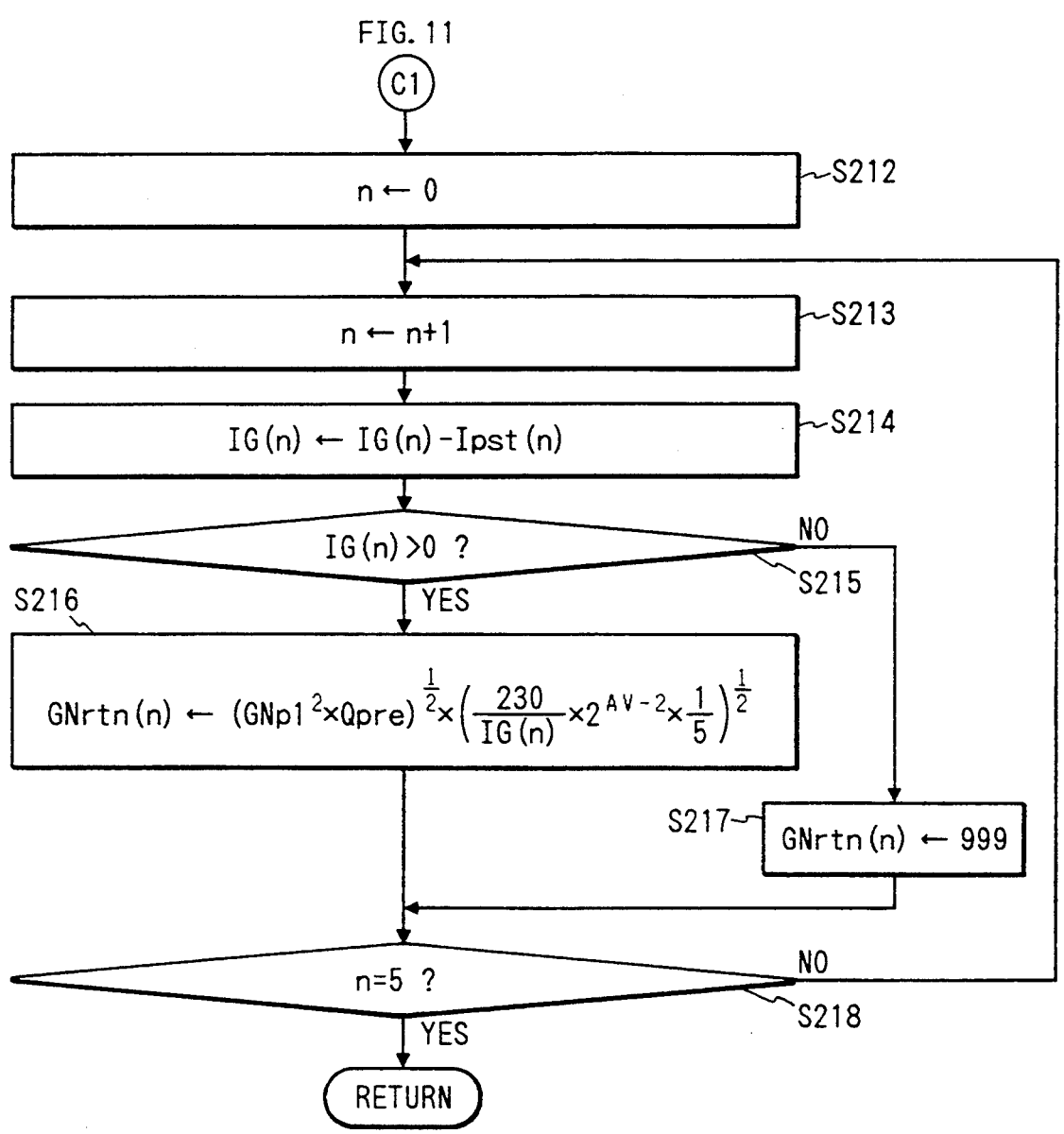

FIGS. 11 and 12 show a flowchart of the preliminary flash process at Step S17 in FIG. 7.

A guide number GNp1 per preliminary flash is set to 2 at Step S201 in FIG. 11. Namely, a plurality of chopping flashes of guide number 2 are carried out as the preliminary flash in this embodiment. At Step S202, gains Gpre(n) are calculated by the following equation for the gain setting devices 52a–52e in the flash amount control circuit 50 in FIG. 5, using the lens correction coefficient Sα(n) obtained at above Step S15.

$$Gpre(n) = \gamma(AV - 3 + \log_2(1/5) - S\alpha(n))$$

The number Qpre of chopping flashes is reset to zero at Step S203. At Step S204 the number Qpre gains an increment of 1, and a timer is started to measure a metering time upon the preliminary flash. Then the flow proceeds to Step S205. At Step 205 chopping flashes are carried out each per guide number GNp1 (GNp1=2). The metering upon the chopping flashes is carried out at Step S206. In detail, an optical flux of each chopping flash is reflected by the photographic field, then passes through the photographic lens 2, and forms a primary image on the curtain surface of shutter 10. The primary image is divided into five, which are respectively received by the five photosensitive element segments 13a–13e via the condenser lens array 12 as shown in FIG. 3. The photosensitive element segments 13a–13e output respective metering signals corresponding to the respective received amounts one after another to the amplifiers 51a–51e in the flash amount control circuit 50.

The amplifiers 51a–51e amplify the received signals with the gains Gpre(n) set in the gain setting devices 52a–52e (which are calculated at Step S202), and output the amplified signals to the integration circuits 53a–53e. The CPU 31 outputs operation signals to the integration circuits 53a–53e, and then the integration circuits 53a–53e integrate with respect to time the respective amplified signals in response to the operation signals to output integration values IG(n) (where n=1–5) to the CPU 31.

A sum of the five metering signals IG(n) is calculated as IG at Step S207, and then the flow goes to Step S208. It is judged at Step S208 whether the sum IG is less than a predetermined value (for example 230 in this embodiment). If the sum is less than the predetermined value, Step S209 is carried out. If it is judged at Step S209 that the number Qpre of chopping flashes is less than 16, the flow returns to Step S204 to repeat the above processes. If the value IG reaches 230 at Step S208 or if the number Qpre reaches 16 at Step S209, the flow goes to Step S210. At Step S210, the count time counted from the start at Step S204 is set as a total metering time tpre required for metering upon the preliminary flash, and then the flow proceeds to Step S211.

At Step S211, the metering of stationary light is carried out through the same optical system as one used in the metering upon preliminary flash. The metering time tpst is set to be equal to the total metering time tpre required for the metering upon the preliminary flash. The thus-obtained metered value of stationary light is referred to as Ipst(n).

At next Steps S212–218, a correction of the stationary light component is made for each of the five outputs of n=1–5, and the guide number GNrtn is calculated. The region number n is first reset to zero at Step S212, and the region number n is then given an increment of 1 at Step S213. At Step S214, the correction is made by subtracting the stationary light component Ipst(n) from the integration value IG(n) including the preliminary flash component and the stationary light component to set the resultant value of subtraction as new IG(n). If it is then judged at Step S215 that the corrected integration value IG(n) is positive, Step S216 is carried out to obtain GNrtn(n) by the following equation.

$$GNrtn(n)=(GNp1^2 \times Qpre)^{\frac{1}{2}} \times [\{230/IG(n)\} \times 2^{AV-2} \times (1/5)]^{\frac{1}{2}}$$

According to this equation, GNrtn(n) becomes a value obtained by multiplying the aperture value F by the photographic distance X, if a subject in each region has the standard reflectance. In other words, there is a subject with standard reflectance at the position of distance X in the region of F·X=GNrtn(n); there exists an object with a higher reflectance than the standard reflectance at the position of distance X in the region of F·X>GNrtn(n); and there exists an object with a lower reflectance than the standard reflectance at the position of distance X in the region of F·X<GNrtn(n). The higher the reflectance of object, the smaller GNrtn(n).

If it is judged at Step S215 that the integration value IG(n) is not positive, a very large value (for example 999 in this embodiment) as regarded as infinity is put into GNrtn(n) at Step S217 and then the flow proceeds to Step S218. It is judged at Step S218 whether n=5. If n=5, the flow returns to the processes in FIG. 7; otherwise to Step S213 to repeat the above processes.

Figure 13:
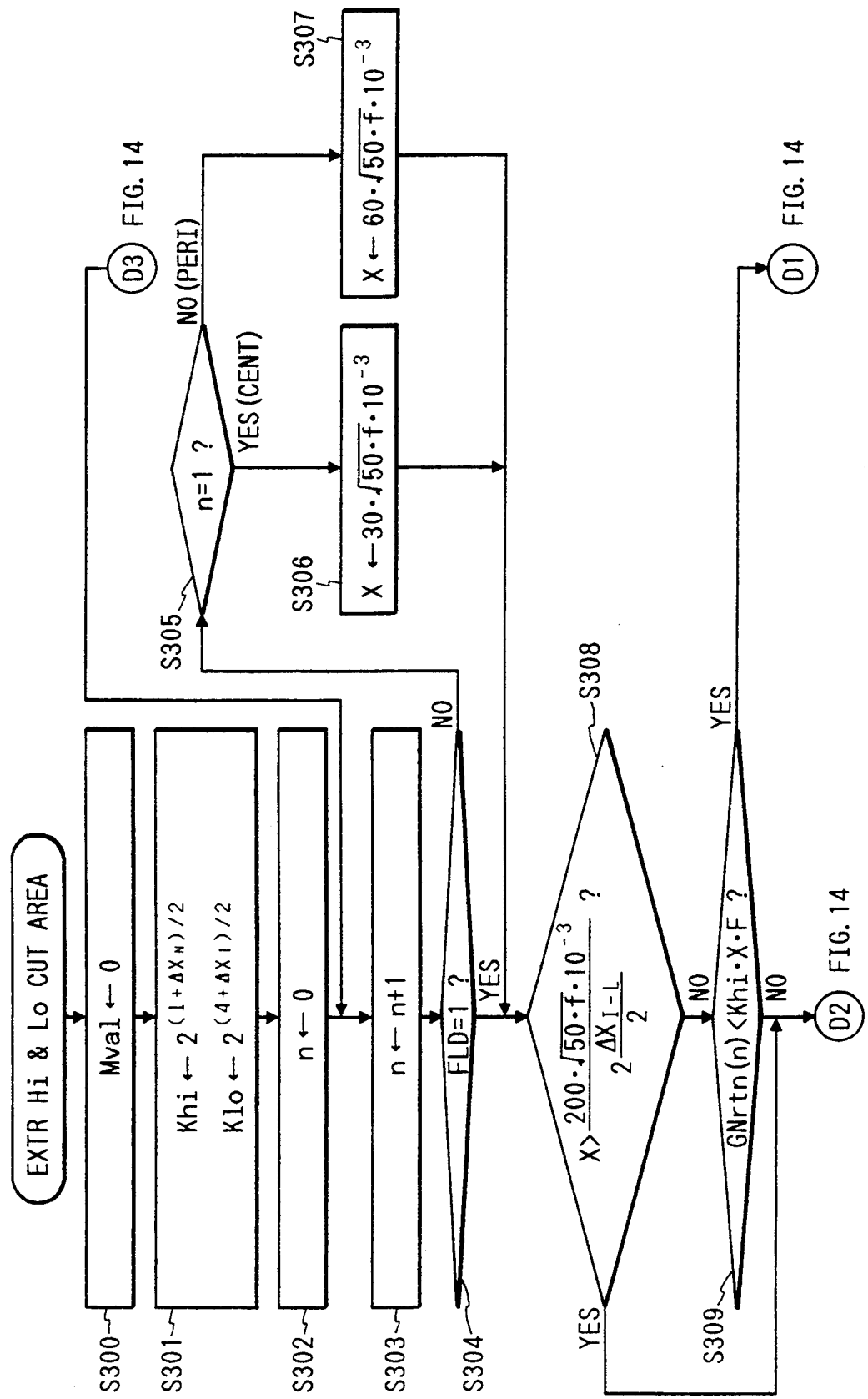
FIG. 13 is a flowchart of a sub-routine to show the details of a process for extracting candidates of regions to be cut.
Figure 14:
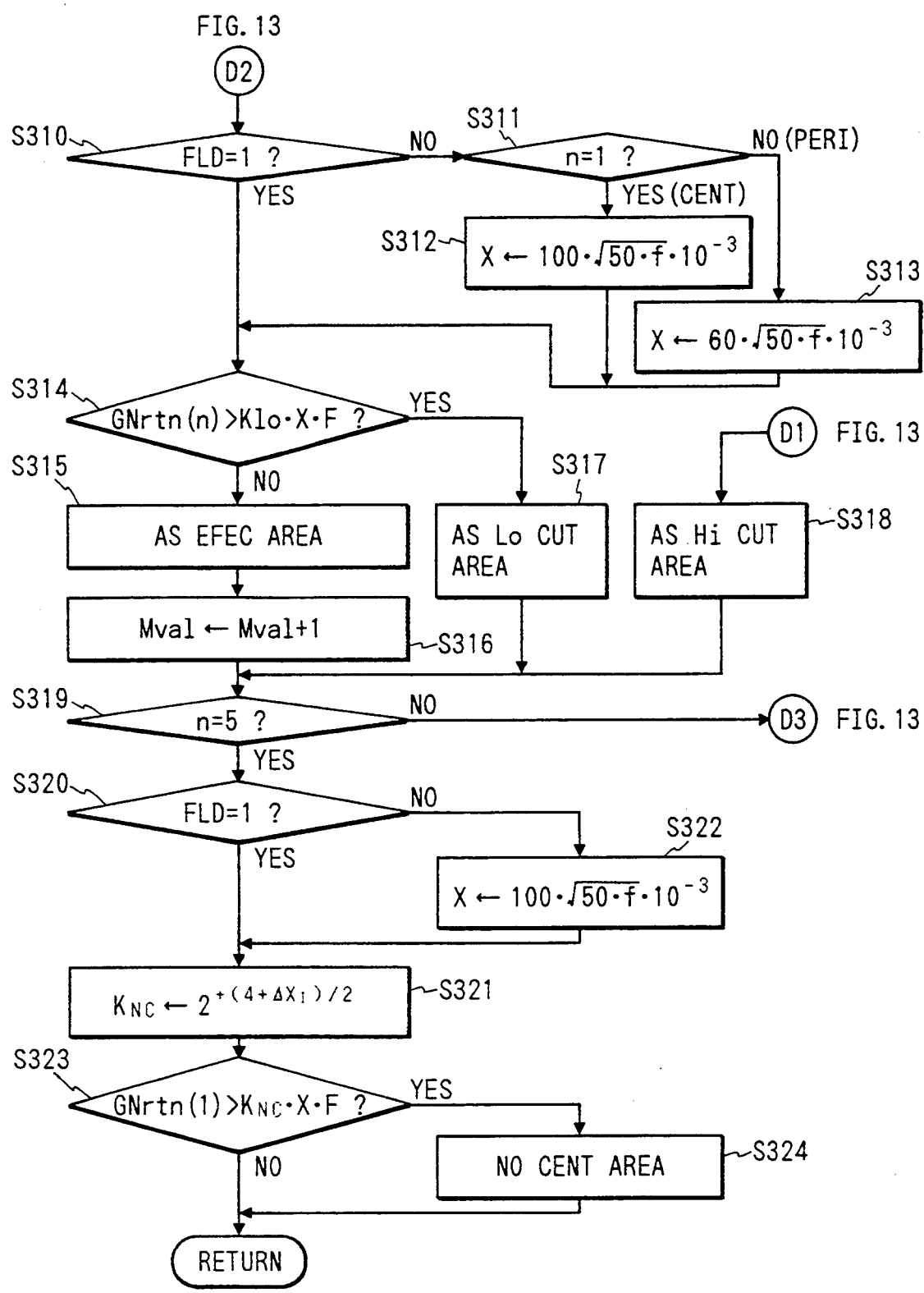
FIG. 14 is a flowchart to follow FIG. 13.

FIGS. 13 and 14 show the details of the process for extracting candidates of Hi and Lo cut regions at Step S18 in FIG. 7.

A number of effective regions, Mval, is reset to zero at Step S300. At Step S301, coefficients Khi and Klo as will be used for Hi cut and Lo cut are set as follows using the total errors obtained at above Step S55:

$$Khi=2^{DH}, \text{ where } DH=-(1+\Delta X_N)/2;$$

and $$Klo=2^{DL}, \text{ where } DL=+(4+\Delta X_I)/2.$$

The coefficient Khi for Hi cut is calculated using the near side total error $\Delta X_N$, and the coefficient Klo for Lo cut using the far side total error $\Delta X_I$. According to the above equations, the coefficient Khi becomes smaller as the error $\Delta X_N$ increases, and the coefficient Klo becomes larger as the error $\Delta X_I$ increases. That is, the coefficients Khi and Klo for cut are determined such that as the error becomes greater it becomes more difficult for a region to be selected as a candidate of Hi cut or Lo cut, or a region is likely to be judged as an effective region with a greater error. By this, such an objectionable judgement may be avoided that a region including the main subject is cut where the detection errors of photographic distance and the like are great. For example, when the total errors $\Delta X_N$ and $\Delta X_I$ both are 0, Khi=0.71 and Klo=4. If the total errors $\Delta X_N$ and $\Delta X_I$ both are 1 [EV], Khi=0.5 and Klo=5.66.

The region number n is reset to zero at next Step S302, and then the region number n is given an increment of 1 at Step S303. It is judged at Step S304 whether the flag FLD is 1. That the flag FLD is not 1 means that the photographic distance X is not detected. If Step S304 is affirmed, or if the photographic distance X is detected, Step S308 is processed. If negated, Step S305 is processed. If n=1 is judged at Step S305, that is, in case that the calculation is for the central region, the photographic distance X is set as follows at Step S306:

$$X=30 \cdot (50 \cdot f)^{\frac{1}{2}} \cdot 10^{-3},$$

where f represents the focal length of photographic lens. Then the flow proceeds to Step S308.

If n is not 1, or in case that the calculation is for a peripheral region, Step S307 is processed to set the photographic distance X as follows, and then the flow proceeds to Step S 308.

$$X=60 \cdot (50 \cdot f)^{\frac{1}{2}} \cdot 10^{-3}$$

At Step S308 it is judged whether the photographic distance X thus detected or set at above steps satisfies the following condition:

$$X > (200 \cdot (50 \cdot f)^{\frac{1}{2}} \cdot 10^{-3})/(2^{DC}),$$

where $DC = \Delta X_{I-L}/2$. If it is negated the flow goes to Step S309; if affirmed to Step S310. The affirmed process corresponds to a case that the photographic distance X recognized by the camera is too large as compared with the ordinary photographic distance conceivable with the focal length of photographic lens 2, which is a countermeasure against an assumptive case that the focus detection circuit 39 judges that the lens is in focus on the background behind the main subject. In photography with flash apparatus, the so-called against-the-light situation, in which the background is brighter than the main subject, is not rare in day light synchro or in slow synchro. In such a situation a focus detection device which effects AGC with higher brightness often performs erroneous focus on the background. If the above countermeasure were not given, the main subject would be Hi-cut at Step S309 due to the incorrect photographic distance X, resulting in obtaining an extremely over-exposed picture.

It is judged at Step S309 whether the guide number GNrtn(n) calculated at above Step S216 in FIG. 12 is smaller than Khi·X·F: if GNrtn(n) < Khi·X·F. If negated, the flow goes to Step S310 in FIG. 14; if affirmed to Step S318 in FIG. 14, judging that there exists an object with a high reflectance such as a golden screen and a mirror in the region, or that there exists a subject (other than the main subject) at a nearer distance than the photographic distance X. Such a region is judged as a Hi-cut region candidate. Then the flow goes to Step S319.

Even if the photographic distance X cannot be detected and only if the value of guide number GNrtn is clearly very small, the region is regarded as a Hi cut region candidate, judging it as a high reflection object at Step S309 with the value obtained at Step S306 or S307. Comparing the value obtained at Step S306 with that at Step S307, the value at Step S306 is devised to be smaller than that at Step S307. It is made more difficult for the center to be judged as a Hi cut region candidate than the periphery. This may reduce a risk to cut the main subject at the center, since it is highly probable that the main subject is located at the center.

It is again judged at Step S310 in FIG. 14 whether the flag FLD is 1. If affirmed, Step S314 is processed, while if negated, Step S311 is processed. If n = 1 at Step S311, or if the calculation is for the center, the flow goes to Step S312 to set the photographic distance X as follows:

$$X = 100 \cdot (50 \cdot f)^{\frac{1}{2}} \cdot 10^{-3}.$$

Then the flow goes to Step S314. While, if n is not 1, or if the calculation is for a peripheral region, the flow goes to Step S313 to set the photographic distance X as follows:

$$X = 60 \cdot (50 \cdot f)^{\frac{1}{2}} \cdot 10^{-3}.$$

Then the flow goes to Step S314.

It is judged at Step S314 whether the guide number GNrtn(n) calculated at above Step S216 (FIG. 12) is larger than Klo·X·F: if GNrtn(n) > Klo·X·F. If it is negated, Step S315 is processed; if affirmed, Step S317 is processed. The region is judged at Step S317 as a LO cut region candidate under a judgement that there exists a low reflectance object in the region (for example like the missing or dark background). Then the flow goes to Step S319.

Even if the photographic distance X cannot be detected and only if the guide number GNrtn is clearly very large, the region is regarded as a Lo cut region candidate, judging it as a low reflectance object, at Step S314 with the value obtained at Step S312 or S313. Comparing the value at Step S312 with that at Step S313, the value at Step S312 is devised to be larger than that at Step S313. It is made more difficult for the center to be judged as a Lo cut region candidate than the periphery. This may reduce a risk to cut the main subject at the center, since there is a high probability that the main subject is located at the center.

If both Steps S309 and S314 are negated, the region is regarded as a candidate of effective region. The number of effective regions Mval is then given an increment of 1 at Step S316, and then the flow goes to Step S319. It is judged at Step S319 whether the region number n is 5, or whether the above processes are completed for all the regions. If not completed, the flow returns to Step S304. If completed, the flow goes to Step S320.

At Step S320 it is judged whether the flag FLD is 1. If affirmed then the flow goes to Step S321; if negated to Step S322. At Step S322 the photographic distance X is set as follows:

$$X = 100 \cdot (50 \cdot f)^{\frac{1}{2}} \cdot 10^{-3}.$$

Then the flow goes to Step S321.

At Step S321 the coefficient $K_{NC}$ is set as follows:

$$K_{NC} = 2^{DD},$$

where $DD = +(4 + \Delta X_I)/2$. Then the flow goes to Step S323. At Step S323 it is judged whether GNrtn(1) of the central region calculated at above Step S216 (FIG. 12) is greater than $K_{NC} \cdot X \cdot F$: if GNrtn(1) > $K_{NC} \cdot X \cdot F$. If it is affirmed then the flow goes to Step S324 to judge that no main subject is present in the central region and thus to identify it as "center absent region." Then the flow returns to the processes in FIG. 7. If negated the flow returns directly to the processes in FIG. 7.

According to the processes in FIGS. 13 and 14, a region is regarded as a Hi cut region candidate if the following condition (1) is satisfied by the guide number GNrtn(n) calculated based on the metering signal of each region upon the preliminary flash:

$$GNrtn(n) < Khi \cdot X \cdot F \qquad (1);$$

a region is regarded as a Lo cut region candidate if the following condition (2) is satisfied:

$$GNrtn(n) > Klo \cdot X \cdot F \qquad (2);$$

and a region is regarded as an effective region candidate if the following condition is satisfied:

$$Khi \cdot X \cdot F \leq GNrtn(n) \leq Klo \cdot X \cdot F.$$

In other words, a region becomes an effective region candidate when the metered value upon the preliminary flash is within the determined range, while a region becomes a cut region candidate when the metered value is out of the range.

The detected photographic distance X could take a value farther by the above near side error than the actual photographic distance. Then, if the above equation (1) were judged without inclusion of the error, there would be such a risk that a region which should not be Hi-cut (a region where the main subject exists) is Hi-cut. In the present embodiment, since the above judgement is carried out using the coefficient Khi for Hi-cut, which, as described above, becomes smaller as the near side error $\Delta X_N$ increases, the region is made more unlikely to be Hi-cut as the error $\Delta X_N$ increases. In other words, such an objectionable judgement is minimized that a region where the main subject exists is Hi-cut.

Further, the detected photographic distance X could take a value nearer by the above far side error than the actual photographic distance. Then, if the above equation (2) were judged without inclusion of the error, there would be such a risk that a region which should not be Lo-cut (a region where the main subject exists) is Lo-cut. In the present embodiment, since the above judgement is carried out using the coefficient Klo for Lo-cut, which, as described above, becomes larger as the far side error $\Delta X_f$ increases as above described, the region is made more unlikely to be Lo-cut as the error $\Delta X_f$ increases. In other words, such an objectionable judgement is minimized that a region where the main subject exists is Lo-cut.

FIGS. 15–20 are flowcharts to show the details of the processes at Step S19 in FIG. 7.

The processes include determination of final control regions and calculation of control correction amount $\Delta Y$. The control correction amount $\Delta Y$ is used when the gains are calculated for the gain setters 52a–52e in the flash amount control circuit 50 upon the main flash, as shown at Step S504 in FIG. 21, which will be described later. If $\Delta Y > 0$, the flash amount is increased by delaying the flash stop time of main flash more as the correction amount increases. Conversely, if $\Delta Y < 0$, the flash amount is decreased by advancing the flash stop time of main flash more as the absolute value $|\Delta Y|$ increases.

Figure 15:
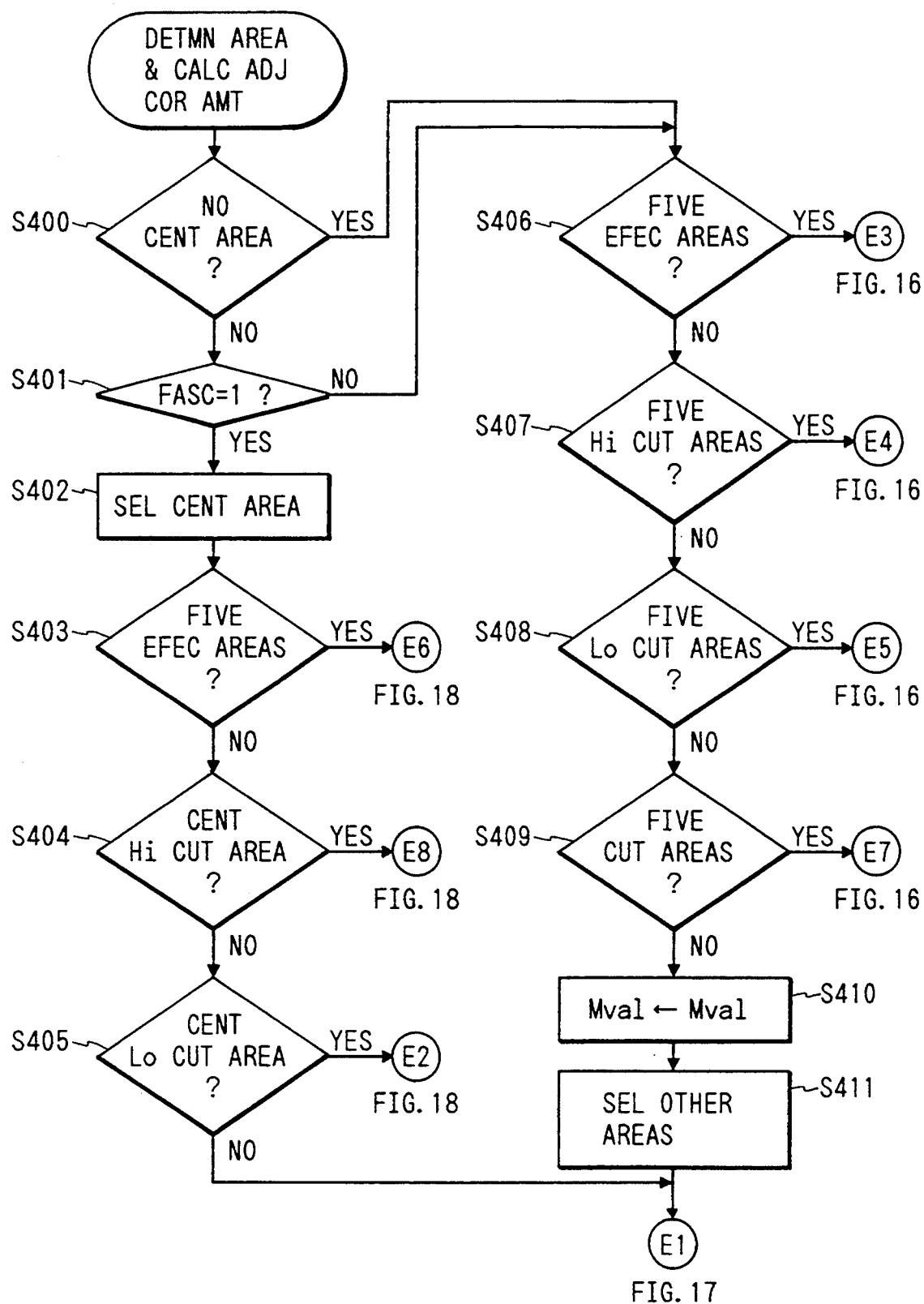
FIG. 15 is a flowchart of a sub-routine to show the details of processes for determining regions to be controlled in flash amount and for calculating a correction amount of flash.

In FIG. 15, it is judged at Step S400 whether the center region is determined as "center absent region" at above Step S324 (FIG. 14). If negated then the flow goes to Step S401; if affirmed to Step S406. This process is provided for a case that it cannot be assured that the main subject is present in the focus detection zone. This judgement is carried out as a higher-rank judgement than the judgement using the output of focus detection apparatus. If the composition is shifted after the lens is focused on the main subject and then focus-locked, the focal length is set for the main subject and the focus detection apparatus is naturally to output a judgement of out-of-focus with respect to the background. However, in case that the focal length of photographic lens 2 is short, the depth becomes shallower, so that it is not rare that the in-focus judgement with the background is output upon change of composition. This process is executed as a countermeasure against it.

It is judged at Step S401 in FIG. 15 whether the aforementioned flag FASC is 1. If the flag is 1, that is, if it is conceivable that the main subject exists in the central portion of screen, the flow Goes to Step S402 to finally determine that the central portion is a flash amount control region. Then the flow Goes to Step S403. If it is judged at Step S403 that all the five regions are effective region candidates from the judgement results of FIGS. 13 and 14, the flow Goes to Step S431 in FIG. 18; otherwise to Step S404. If the central region is judged as a Hi cut region candidate at Step S404, the flow Goes to Step S430 in FIG. 18; otherwise to Step S405. If the central region is judged as a Lo cut region candidate at Step S405, the flow goes to Step S429 in FIG. 18; otherwise to Step S420 in FIG. 17.

Unless FASC=1 at Step S401, or if there appears the main subject absent in the center region, the flow goes to Step S406. The following is judged at Steps S406–409 from the results of processes in FIGS. 13 and 14: (1) whether all the five regions are effective region candidates; (2) whether all the five regions are Hi cut region candidates; (3) whether all the five regions are Lo cut region candidates; (4) whether all the five regions are cut region candidates and further whether Hi cut and Lo cut region candidates are mixed; (5) whether there are cut region candidates and effective region candidates mixed. The following processes are carried out depending on the judgement results.

Figure 16:
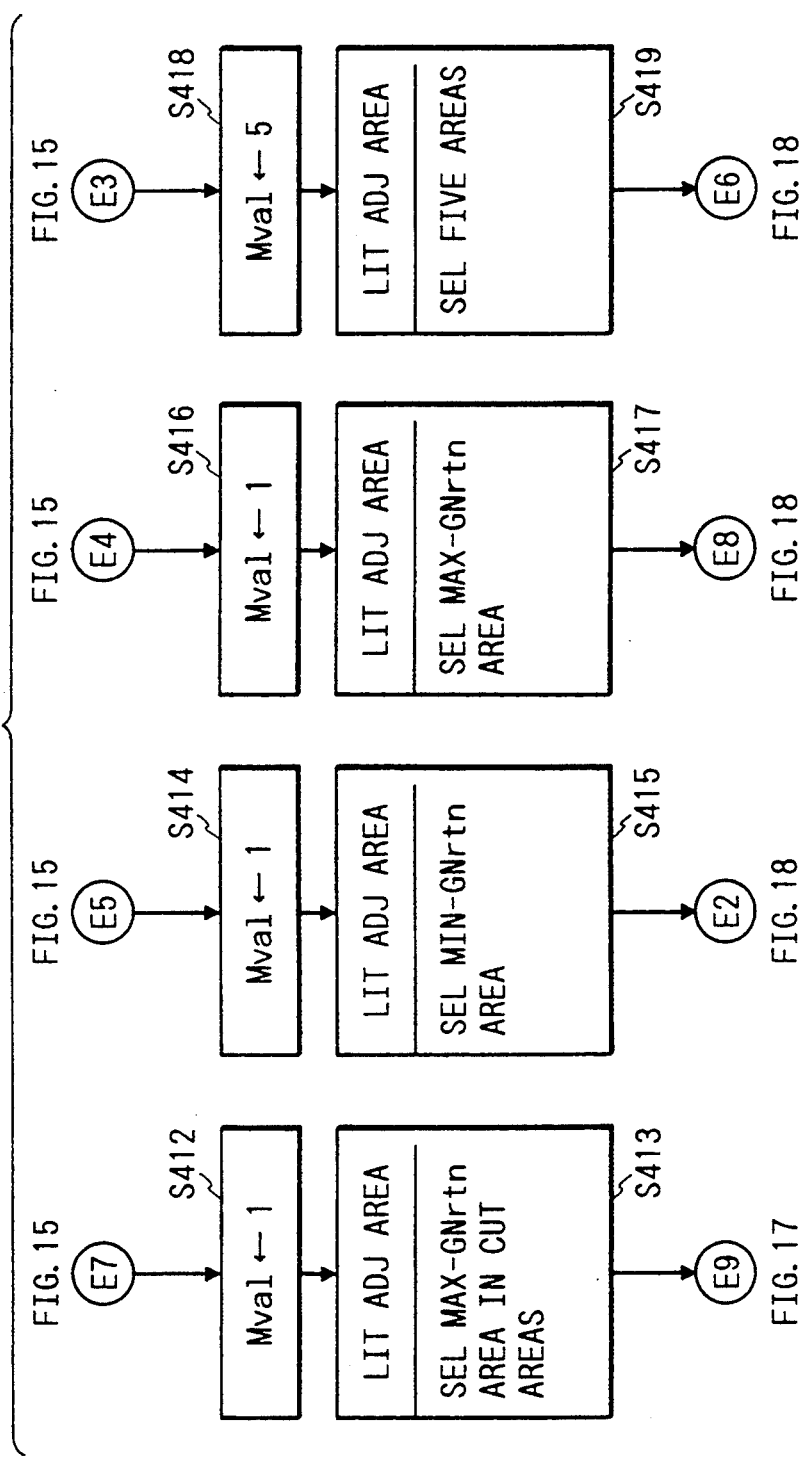
FIG. 16 is a flowchart to follow FIG. 15.
Figure 17:
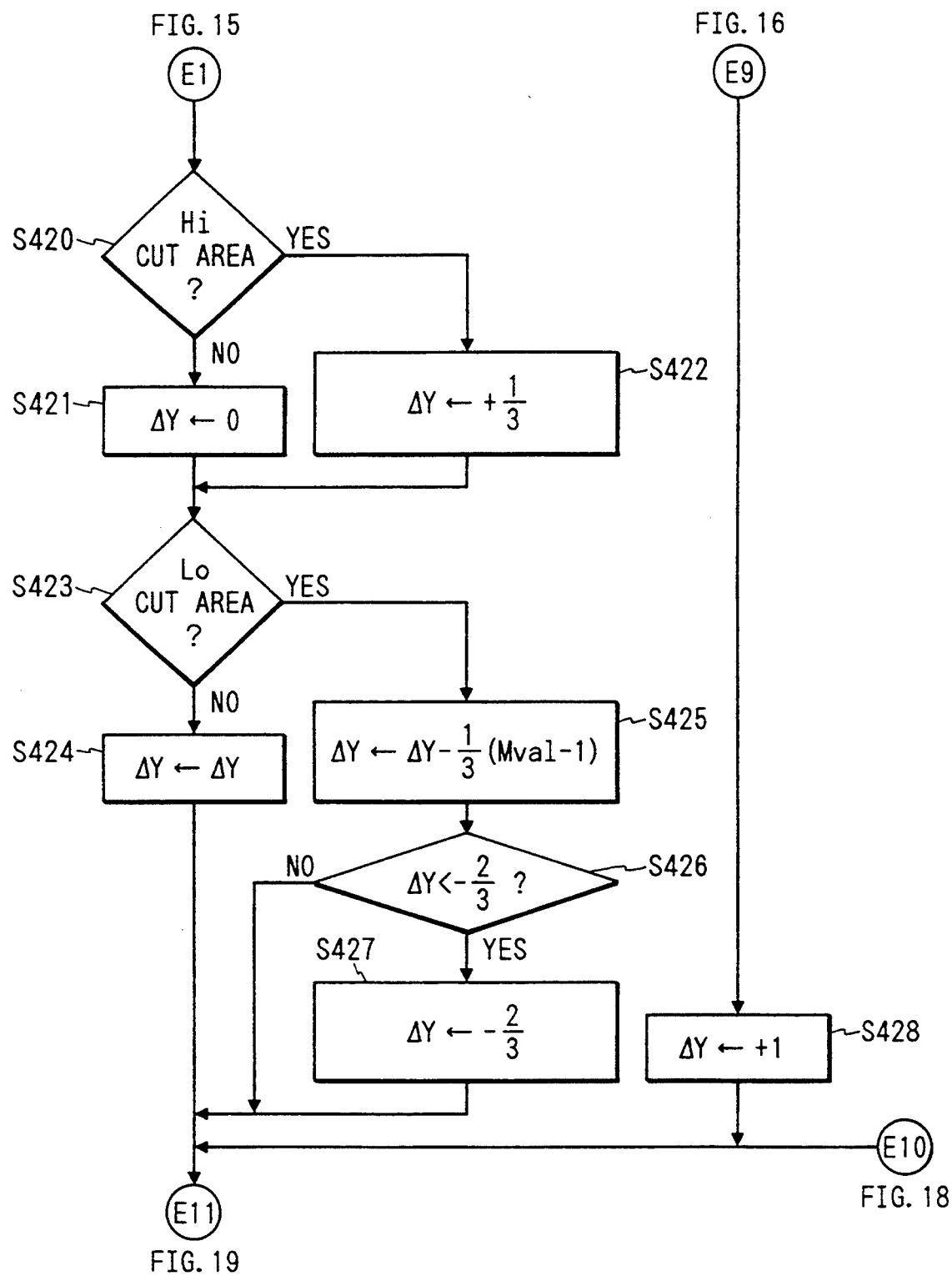
FIG. 17 is a flowchart to follow FIGS. 15 and 16.
Figure 18:
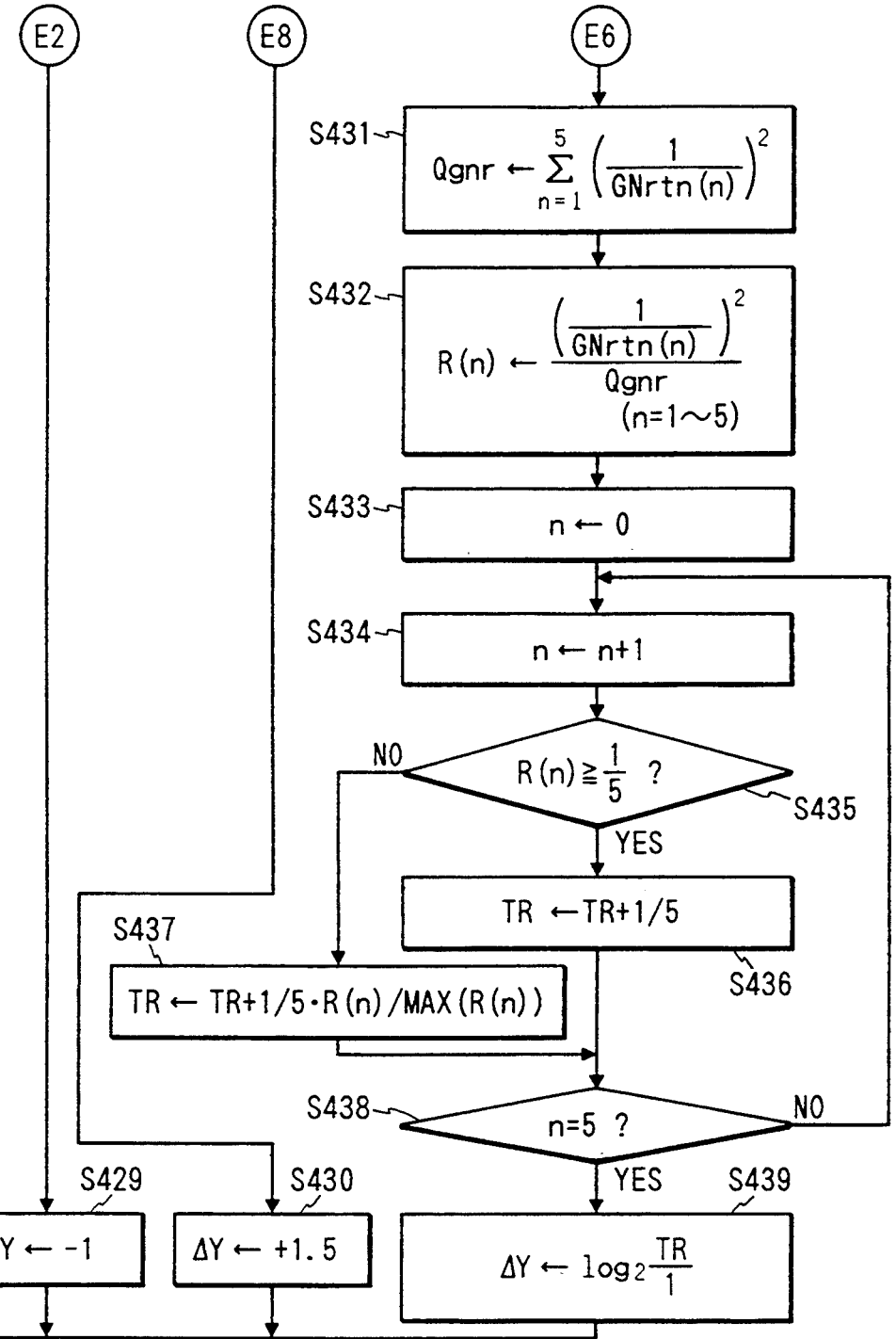
FIG. 18 is a flowchart to follow FIGS. 15 and 16.

(1) If all five regions are effective region candidates:

In this case, Step S406 is affirmed and then the flow proceeds to Step S418 in FIG. 16 to set 5 as the number of effective regions Mval. All the five regions are finally determined as flash amount control regions, and then the flow proceeds to Step S431 in FIG. 18. At Step S431, a summation Qgnr of metered values of the five regions upon the preliminary flash is calculated by the following equation.

$Qgnr = \Sigma(1/GNrtn(n))^2$, where $\Sigma$ represents a summation of n=1–5. Further at Step S432, a distribution R(n) of metered values of respective regions is calculated by the following equation where the summation of metered values of five regions is set to 1.

$R(n) = (1/GNrtn(n))^2/Qgnr$, where n=1–5.

The region number n is reset to zero at Step S433. At Steps S434–S438 processes are carried out to obtain TR, based on the distribution R(n) (where n=1–5) for the five regions. In detail, if R(n) is not less than 1/5, a new TR is set by adding 1/5 to the previous TR. If R(n) is less than 1/5, a new TR is calculated by the following equation.

$TR = TR + (1/5) \times R(n)/MAX(R(n))$ where TR on the right side is the previous TR, and MAX(R(n)) is the maximum of R(n). The control correction amount $\Delta Y$ is calculated at Step S439 by the following equation, using the finally calculated TR.

$\Delta Y = \log_2(TR/1)$

As seen, the control correction amount $\Delta Y$ is calculated based on the distribution of metered values of respective regions, so that a stop timing of main flash may be well controlled in the main flash process in FIGS. 21 and 22 as described later.

(2) If all five regions are Hi cut region candidates:

In this case, Step S407 in FIG. 15 is affirmed, and then the flow proceeds to Step S416 in FIG. 16 to set 1 as the number Mval. A region having the highest guide number GNrtn(n) is newly and finally determined as a control target region at Step S417. The highest guide number GNrtn(n) means that the metering signal is minimum upon the preliminary flash or closest to the aforementioned, predetermined range for judging whether a region is a Hi cut region, where there is the least influence expected from the high reflectance object. If there are plural candidates to be selected as the highest, a region with smaller region number has the priority. The control correction amount $\Delta Y$ is then set to "+1.5" at Step S430 in FIG. 18. That is, if all the regions are Hi cut regions, the flash control stop timing is delayed to prevent the under-exposure.

(3) If all five regions are Lo cut region candidates:

In this case, Step S408 in FIG. 15 is affirmed, and then the flow proceeds to Step S414 in FIG. 16 to set 1 as the number Mval. A region with lowest guide number GNrtn(n) is newly determined as a control target region. The lowest guide number GNrtn(n) means that the metering signal is maximum upon the preliminary flash, or closest to the aforementioned, predetermined range for judging whether a region is a cut region, where there is the least influence expected from no return of reflection light of flash. If there are plural candidates to be selected as the lowest, a region with smaller region number has the priority. The control correction amount $\Delta Y$ is set to "−1" at Step S429 in FIG. 18. That is, if all the regions are Lo cut region candidates, the flash control stop timing is advanced to prevent the over-exposure.

(4) If all five regions are cut region candidates and if Hi cut and Lo cut region candidates are mixed:

In this case, Step S409 in FIG. 15 is affirmed, and then the flow proceeds to Step S412 in FIG. 16 to set 1 as the number Mval. At Step S413, a region with highest guide number GNrtn(n) is newly determined as a control target region out of the Hi-cut region candidates. Further, the control correction amount $\Delta Y$ is set to "+1" at Step S428. The main subject is considered to reside in the Hi cut region candidates, because there must exist no object in the missing or dark background in the Lo cut region candidates, but because there must exist a high reflectance object, for example a golden screen or a mirror, in the Hi cut region candidates. Therefore, the correction amount $\Delta Y$ is set to "+1" to avoid the influence both from high reflectance object and from low reflectance object.

(5) If cut region candidates and effective region candidates are mixed:

In this case, Step S409 in FIG. 15 is negated and then the flow proceeds to Step S410 to set the number Mval obtained at above Step S316 in FIG. 14 as Mval. Further, the effective regions are finally determined as control target regions at Step S411. It is then judged at Step S420 in FIG. 17 whether there is a Hi cut region candidate. If there is even one, the control correction amount $\Delta Y$ is set to "+⅓" at Step S422. If there is no Hi cut region, the correction amount $\Delta Y$ is set to 0 at Step S421, and then the flow goes to Step S423. It is judged at Step S423 whether there is a Lo cut region candidate. If there is, the flow proceeds to Step S425 to set the correction amount as follows:

$$\Delta Y = \Delta Y - (\tfrac{1}{3}) \times (Mval - 1).$$

A limitation of −⅔ is applied to the correction amount $\Delta Y$ at Steps S426 and S427. If there is no Lo cut region candidate, the flow proceeds to Step S424 to set the current correction amount $\Delta Y$ as a new amount $\Delta Y$.

If there is a Hi cut region candidate, there exists a high reflectance object therein, as described above. Even if adjacent regions are not Hi cut regions, they may be affected by the object. Therefore, the correction amount $\Delta Y$ is set to "+⅓".

In contrast, there is explained in the following a case that a Lo cut region candidate is present.

Suppose there exists nothing behind the main subject. In this case, the number of effective regions is different even with a subject of same magnification between in case that the subject is present at an edge of screen and in case that the subject is present near the center of screen. If the subject is present at the edge of screen, there are less regions including the subject, decreasing the effective regions (regions not to be Lo-cut). If the subject is located near the center of screen, more regions include the subject, increasing the number of effective regions. If the magnification of subject is identical, the more the effective regions or regions including the subject, the smaller an area which the subject occupies in the each region, decreasing the metering signal upon the preliminary flash. Accordingly in this embodiment, as shown by the equation of above Step S425, as the number Mval of effective regions increases, the amount $\Delta Y$ is shifted more in the negative range.

Figure 19:
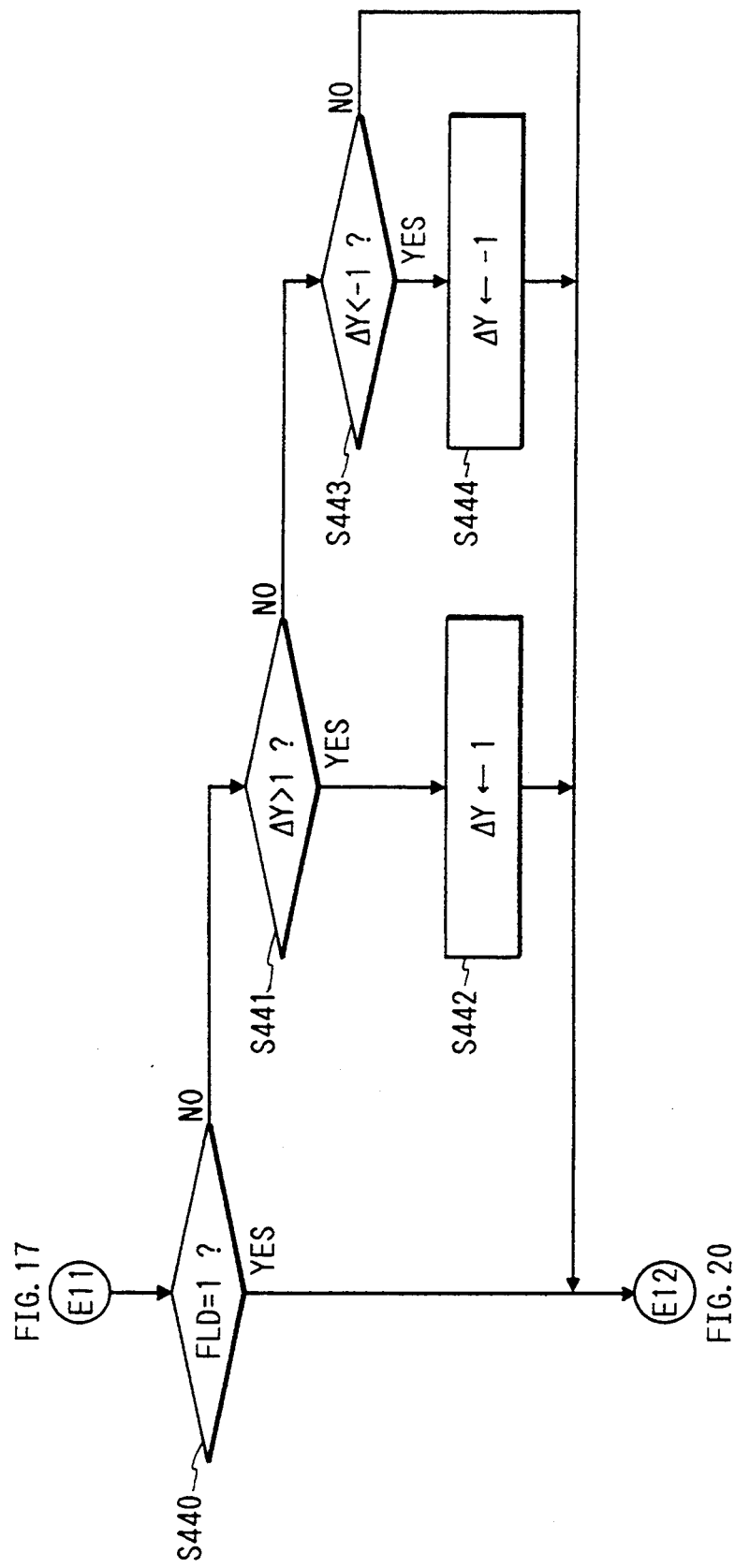
FIG. 19 is a flowchart to follow FIG. 17.

After Steps S424, S427, and S428, it is judged at Step S440 in FIG. 19 whether the flag FLD is 1. If it is 1, the flow proceeds to Step S445 in FIG. 20; otherwise, in case that the photographic distance X cannot be detected, the flow proceeds to Step S441. It is risky to set a large value as the control correction amount $\Delta Y$ if the photographic distance X cannot be detected. Then limits are set to define a range between −1 and +1 for the calculated correction amount $\Delta Y$ at Steps S441–S444.

Figure 20:
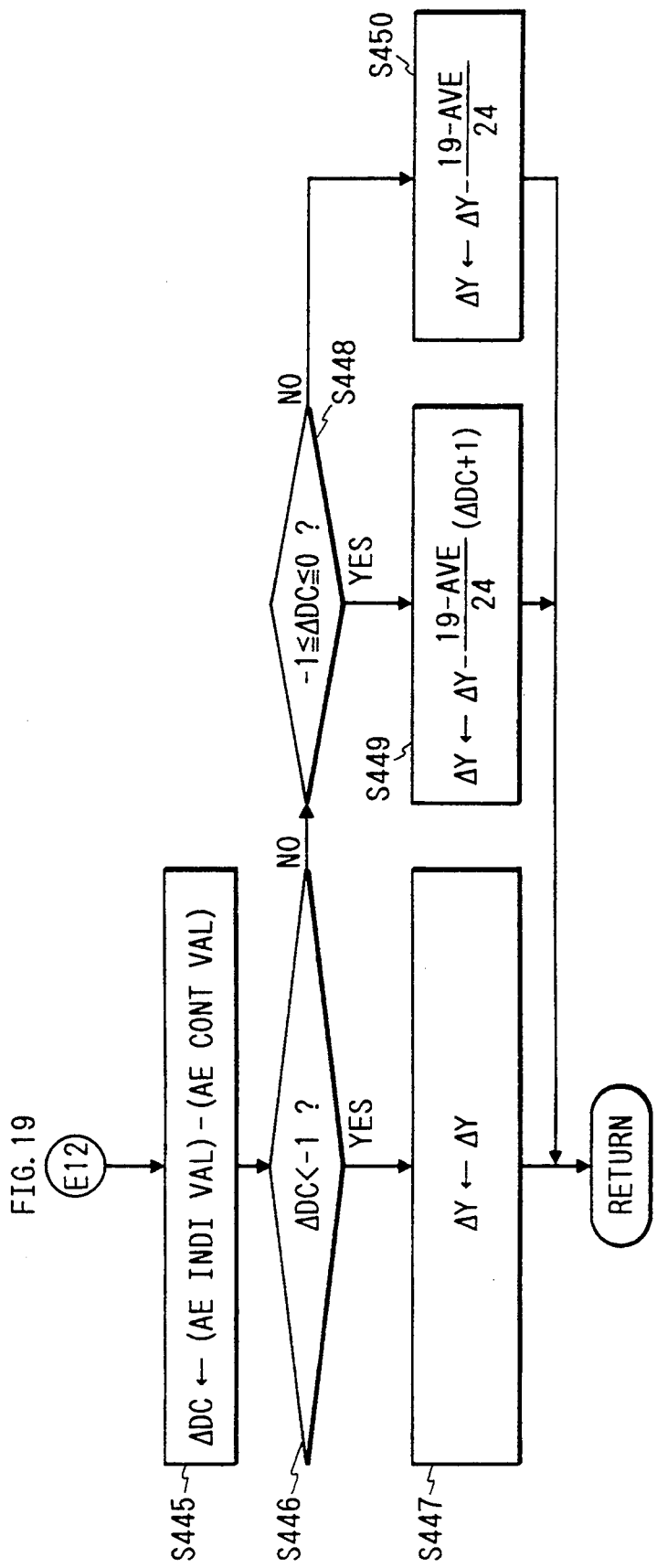
FIG. 20 is a flowchart to follow FIG. 19.

$\Delta DC$ is obtained at Step S445 in FIG. 20 by subtracting an AE control value actually controlled from an AE indicated value, which is an ideal exposure value with stationary light calculated by the camera.

Here, the case that $\Delta DC$ is not 0, is a case of photographing in the manual exposure mode, or a case that flash synchronization time reaches a limit to result in photography out of the range of synchronization. The correction amount $\Delta Y$ is again corrected at Steps S446–S450 in accordance with the value of $\Delta DC$.

It is judged at Step S446 whether $\Delta DC$ is smaller than −1. If it is smaller than −1, or if the stationary light is controlled under 1 EV, no further correction is effected at Step S447 to maintain the control correction amount $\Delta Y$ as it is. If $-1 \leq \Delta DC \leq 0$, correction is carried out by the following equation to decrease the flash amount by the illumination of stationary light.

$$\Delta Y = \Delta Y - ((19 - AVE)/24) \times (\Delta DC + 1)$$

where AVE represents an average of five brightness values (BV) of stationary light obtained by the segmental metering element 8. As it becomes darker, or as $\Delta DC$ becomes larger, the control correction amount $\Delta Y$ is corrected more in the negative range. Further, if $0 < \Delta DC$, similar correction is carried out by the following equation.

$$\Delta Y = \Delta Y - ((19 - AVE)/24)$$

FIGS. 21 and 22 show the details of the main flash process at Step S20 of FIG. 7.

In FIG. 21, the region number n is reset to zero at Step S501, and the number n is given an increment of 1 at Step S502. It is judged at Step S503 whether the region of region number n is designated as a control target region. If Step S503 is negated, the flow proceeds to Step S505 to set a fully small value (for example −10) as Gains Ghon(n) for the Gain setting devices 52a–52e in the flash amount control circuit 50. On the other hand, if Step S503 is affirmed, gains Ghon(n) are calculated as follows at Step S504, using the correction amount ΔY obtained in the above processes.

$$Ghon(n) = \gamma(SV + \log_2(1/Mval) - S\beta - \Delta Y)$$

where SV is the ISO speed of film, Sβ a lens correction coefficient obtained at Step S19, ΔY a control correction amount, and y a constant. Then the flow Goes to Step S506. It is judged at Step S506 whether n=5. If negated, the flow returns to Step S502 to repeat the above processes. If affirmed, the flow proceeds to Step S507 in FIG. 22.

By the above processes, the gains Ghon(1)–Ghon(5) are given to the gain setters 52a–52e, respectively.

The main flash of the electronic flash apparatus 11 is started at Step S507. The metering is carried out at Step S508. Illumination light of main flash is reflected by the subject, passes through the photographic lens 2, is reflected at the film plane, and is then received by the five photosensitive element segments 13a–13e. Metering signals IG(1)–IG(5) of photosensitive element segments 13a–13e are input into the amplifiers 51a–51e of flash amount control circuit 50. The amplifiers 51a–51e amplify the metering signals IG(1)–IG(5) with the gains Ghon(1)–Ghon(5) set by the gain setters 52a–52e then to output the amplified signals to the adder 54. The adder 54 adds up these amplified signals input thereinto. The integration circuit 55 integrates with respect to time the addition result of adder 54 or summation of amplified metering signals IG(1)–IG(5), designating its integration value as IG (Step S509).

A preliminarily set flash amount control level LV is output to the converting circuit 56. The converting circuit 56 converts the level into an analog signal. The thus-converted flash amount control level and the output IG of the integration circuit 55 are input into the comparator 57. The comparator 57 judges if the output IG reaches the flash amount control level LV (Step S510). If it is negated the flow returns to Step S508; otherwise to Step S511 to stop the main flash by controlling the flash control circuit 38 of the electronic flash apparatus 11. After that, the processes are completed.

According to the above-explained procedure, the gain Ghon(n) is calculated based on the control correction amount ΔY. If ΔY>0, the flash stop timing of main flash is more delayed to increase the flash amount as the correction amount becomes larger. If ΔY<0, the flash stop timing of main flash is more advanced to decrease the flash light amount as |ΔY| becomes larger.

The above is the control procedure executed by the CPU 31 in flash photography. According to the procedure, metering regions which are to contribute to the flash amount control upon the main flash (effective regions) are determined using the metered values upon the preliminary flash, the photographic distance X input from the photographic lens 2, and the detection error ΔX of photographic distance; and the flash amount control upon the main flash is carried out using the metered values of the effective regions. The regions to contribute to the flash amount control upon the main flash are thus determined including the detection error of the photographic distance, so that the effective regions and the cut regions may be accurately discriminated from each other even if the detection accuracy of photographic distance is poor.

In the above arrangement of the embodiment, the electronic flash apparatus 11 constitutes the flashing means 101, the photosensitive element 13 and the flash amount control circuit 50 the metering means 102, the CPU 31 the flash amount control region determining means 103, and the CPU 31 and the flash amount control circuit 50 the flash amount controlling means 104.

Although the photographic field is divided into the five regions in total including the center region and the peripheral regions thereof in the above embodiment, the way of division and the number of divided regions are not limited to those in the above embodiment.

According to the present invention as described, the following advantages may be attained.

(1) The first measure is such that if the photographic lens has a short focal length, which is liable to provide erroneous focus detection information, the regions preponderantly to contribute to the flash amount control are determined irrespective of the output of focus detection device. Then, even if the focus detection device makes an erroneous detection, the proper flash amount control is possible.

(2) The second measure is such that if the values detected upon preliminary flash before exposure are small, the regions preponderantly to contribute to the flash amount control are determined irrespective of the output of focus detection device. Then, even if the focus detection device makes an erroneous detection, the proper flash amount control is possible.

(3) Further according to the present invention, if the photographic distance obtained by camera is very long as compared with normally conceivable photographic distance, it is inhibited to extract the noneffective regions with the photographic distance. Then, even if the photographic distance is erroneously detected, the proper flash amount control is possible.

What is claimed is:

1. An automatic flash amount control apparatus of camera, comprising:
flashing means capable of performing preliminary flash carried out before an exposure operation of camera and main flash carried out during the exposure operation;
metering means for metering in a plurality of divided metering regions beams emitted from said flashing means and reflected by a photographic field;
photographic distance value output means for outputting a value concerning a photographic distance;
control means for specifying and excluding a region a metering value of which is not used among said plurality of metering regions, based on a metering result upon said preliminary flash and said photographic distance value and for adjusting a flash amount of said flashing means upon main flash, based only on metering values of regions except for the excluded region; and
inhibiting means for comparing said photographic distance value with a predetermined value and for inhibiting an region exclusion operation of said control means if said photographic distance value is judged as greater than said predetermined value.

2. An automatic flash amount control apparatus according to claim 1, wherein said control means specifies and excludes said region, if a metering value of a metering region metered by said metering means is larger than a maximum value or smaller than a minimum value.

3. An automatic flash amount control apparatus according to claim 2, wherein said photographic distance value output means determines the photographic distance value, based on said metering region with larger metering value, and
wherein said inhibiting means inhibits the region exclusion operation of said control means, if said photographic distance value is considerably larger than a normal photographic distance conceivable from a focal length of photographic lens.

4. An automatic flash amount control apparatus according to claim 1, wherein said predetermined value concerns a focal length of photographic lens.

5. An automatic flash amount control apparatus for a camera to which a photographic lens is attached, comprising:
a focus detecting means for detecting a focus at a predetermined region in a photographic field;
photometering means for photometering in a plurality of divided photometering regions beams emitted from flashing means and then reflected by the photographic field;
control region selecting means for selecting a photometering region preponderantly to contribute to a flash amount adjustment; and
control means for adjusting a flash amount of said flashing means, based on a photometering value in the photometering region selected by said control region selecting means;
wherein said control region selecting means selects the predetermined region in accordance with an output of said focus detecting means if said photographic lens has a long focal length, but selects a region previously determined if said photographic lens has a short focal length.

6. An automatic flash amount control apparatus according to claim 5, wherein the predetermined region overlaps a part of the photometering regions.

7. An automatic flash amount control apparatus according to claim 5, wherein the region previously determined is whole photometering regions.

8. An automatic flash amount control apparatus for a camera, comprising:
flashing means capable of performing preliminary flash carried out before an exposure operation of the camera and main flash carried out during the exposure operation;
photometering means for photometering in a plurality of divided photometering regions beams emitted from a flashing means and then reflected by a photographic field;
focus detecting means for detecting a focus at a predetermined region of the photographic field;
control region selecting means for selecting a photometering region preponderantly to contribute to a flash amount adjustment; and
control means for adjusting a flash amount upon main flash of said flashing means, based on a photometering value upon preliminary flash in the photometering region selected by said control region selecting means;
wherein said control region selecting means selects the predetermined region if an output of said focus detecting means at the photometering region overlapping the predetermined region is within a predetermined range, but selects a region previously determined if the output is out of the predetermined range.

9. An automatic flash amount control apparatus according to claim 8, wherein the region previously determined is whole photometering regions.

10. A method of controlling a flash amount for a camera to which a photographic lens is attached, comprising the steps of:
detecting a focus at a predetermined region in a photographic field;
photometering in a plurality of divided photometering regions beams emitted from a flashing device and then reflected by the photographic field;
selecting a photometering region as one preponderantly to contribute to a flash amount adjustment in accordance with the focus detecting if said photographic lens has a long focal length;
selecting a region previously determined as one preponderantly to contribute to a flash amount adjustment if said photographic lens has a short focal length; and
adjusting a flash amount of said flash device on the basis of a photometering value at the selected photometering region.

11. An automatic flash amount control apparatus for a camera to which a photographic lens is attached, comprising:
a focus detecting device which detects a focus at a predetermined region in a photographic field;
a photometering device which photometers in a plurality of divided photometering regions beams emitted from a flashing device and then reflected by the photographic field; and
a processor including a portion which selects a photometering region preponderantly to contribute to a flash amount adjustment, and a portion which adjusts a flash amount of said flashing device, based on a photometering value in the photometering region selected;
wherein said processor selects the predetermined region in accordance with an output of said focus detecting device if said photographic lens has a long focal length, but selects a region previously determined if said photographic lens has a short focal length.

12. A method of controlling a flash amount for a camera, comprising the steps of:
photometering in a plurality of divided photometering regions beams emitted from a flashing device and then reflected by a photographic field;
outputting a value relating to a photographic distance;
comparing the value relating to the photographic distance with a predetermined value;
specifying and excluding a region of which a photometering distance is not used among said plurality of photometering regions, based on a photometering result and the value relating to the photographic distance, if the value relating to the photographic value is less than the predetermined value, and adjusting a flash amount of said flashing device on the basis of only photometering values of regions other than the excluded regions; and
inhibiting a region exclusion operation if the value relating to the photographic distance is greater than the predetermined value.

13. An automatic flash amount control apparatus for a camera, comprising:

a flashing device capable of performing preliminary flash carried out before an exposure operation of the camera and main flash carried out during the exposure operation;

a photometering device which photometers in a plurality of divided photometering regions beams emitted from said flashing device and reflected by a photographic field;

a photographic distance value output device which outputs a value relating to a photographic distance; and a processor including a portion which specifies and excludes a region of which a photometering value is not used among said plurality of photometering regions, based on a photometering result upon said preliminary flash and said photographic distance value and which adjusts a flash amount of said flashing device upon main flash, based only on photometering values of regions other than the excluded region, and a portion which compares the photographic distance value with a predetermined value and which inhibits a region exclusion operation if the value relating to the photographic distance is greater than the predetermined value.

* * * * *